United States Patent
Saito

(10) Patent No.: US 8,656,450 B2
(45) Date of Patent: Feb. 18, 2014

(54) SECURITY POLICY SWITCHING DEVICE, SECURITY POLICY MANAGEMENT SYSTEM, AND STORAGE MEDIUM

(75) Inventor: Kazuo Saito, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 997 days.

(21) Appl. No.: 12/110,440

(22) Filed: Apr. 28, 2008

(65) Prior Publication Data

US 2009/0165084 A1    Jun. 25, 2009

(30) Foreign Application Priority Data

Dec. 25, 2007    (JP) .................................. 2007-332062

(51) Int. Cl.
*G06F 17/00* (2006.01)
*H04L 29/06* (2006.01)

(52) U.S. Cl.
CPC ...................................... *H04L 63/20* (2013.01)
USPC ........................................................... 726/1

(58) Field of Classification Search
USPC ........................................................... 726/1
See application file for complete search history.

(56) References Cited

U.S. PATENT DOCUMENTS

| | | | |
|---|---|---|---|
| 5,778,365 A * | 7/1998 | Nishiyama | 1/1 |
| 2003/0120655 A1 * | 6/2003 | Ohwada et al. | 707/9 |
| 2005/0021980 A1 | 1/2005 | Kanai | |
| 2005/0262362 A1 * | 11/2005 | Patrick et al. | 713/193 |
| 2006/0048218 A1 * | 3/2006 | Lingafelt et al. | 726/11 |
| 2007/0244899 A1 * | 10/2007 | Faitelson et al. | 707/9 |
| 2008/0028436 A1 * | 1/2008 | Hannel et al. | 726/1 |

FOREIGN PATENT DOCUMENTS

| | | |
|---|---|---|
| JP | 2005038371 | 2/2005 |
| JP | 2007060122 | 3/2007 |
| JP | 2007183743 | 7/2007 |
| JP | 2007226464 | 9/2007 |
| JP | 2007233610 | 9/2007 |
| WO | 2004109443 | 12/2004 |

OTHER PUBLICATIONS

JP Office Action with English translation thereof, issued on Nov. 24, 1009, in connection with Japanese Application No. 2007-332062.

* cited by examiner

*Primary Examiner* — Peter Shaw
(74) *Attorney, Agent, or Firm* — Gesmer Updegrove LLP

(57) ABSTRACT

A security policy switching device includes a policy information storage that stores policy setting information and identification information of a policy in correspondence to each other, the policy setting information including setting content of the policy and identification information of a user to whom the policy is attached, a data information storage that stores identification information of data for which a policy is set and identification information of a policy attached to the data in correspondence to each other, and a policy switching unit that switches, in response to a switching request designating identification information of data for which the policy is to be switched and identification information of a user instructing the switch, a policy attached to the data by updating identification information of the policy attached to the data stored in the data information storage with identification information of another policy.

12 Claims, 22 Drawing Sheets

EXAMPLE DATA STRUCTURE OF SECURITY POLICY DB

| POLICY ID | POLICY NAME | USAGE RANGE | VALID TERM | PERMITTED FUNCTION LIST |
|---|---|---|---|---|
| 0001 | IN-SECTION REFERENCE FOR SOFTWARE DEVELOPMENT SECTION | MEMBER ORGANIZATION: SOFTWARE DEVELOPMENT SECTION | 180 DAYS FROM CREATION | VIEW OF ELECTRONIC DOCUMENT PRINT OF ELECTRONIC DOCUMENT COPY OF PAPER DOCUMENT SWITCH OF POLICY |
| | | CREATOR | NO LIMITED DURATION | VIEW OF ELECTRONIC DOCUMENT EDIT OF ELECTRONIC DOCUMENT PRINT OF ELECTRONIC DOCUMENT COPY OF PAPER DOCUMENT SCAN OF PAPER DOCUMENT SWITCH OF POLICY |
| 0002 | SALES REFERENCE | NO LIMITED RANGE | 30 DAYS FROM CREATION | VIEW OF ELECTRONIC DOCUMENT |
| | | MEMBER ORGANIZATION: SALES SECTION | 180 DAYS FROM CREATION | VIEW OF ELECTRONIC DOCUMENT EDIT OF ELECTRONIC DOCUMENT COPY OF PAPER DOCUMENT |
| | | CREATOR | NO LIMITED DURATION | VIEW OF ELECTRONIC DOCUMENT EDIT OF ELECTRONIC DOCUMENT PRINT OF ELECTRONIC DOCUMENT COPY OF PAPER DOCUMENT SCAN OF PAPER DOCUMENT SWITCH OF POLICY |
| ... | | | | ... |

FIG. 5

EXAMPLE DATA STRUCTURE OF DOCUMENT INFORMATION DB

| DOCUMENT ID | POLICY ID | CREATOR ID | OPERATION DATE AND TIME |
|---|---|---|---|
| 40ffaaa4-0fb6-4634-85bf-bba45bc941b5 | 0001 | fx12345 | JANUARY 20, 2007 10:00 |
| 4FB6BB00-3347-11d0-B40A-00AA005FF586 | 0002 | fx19810 | OCTOBER 1, 2006 10:00 |
| AED6483F-3304-11d2-86F1-006008B0E5D2 | 0002 | fx25615 | OCTOBER 3, 2006 14:23 |
| FDF9C30D-CCAB-3E2D-B584-9E24CE8038E3 | 0002 | fx16982 | OCTOBER 10, 2006 16:32 |
| ... | | | ... |

FIG. 6

EXAMPLE SECURITY POLICY REGISTERING REQUEST

```
<PolicyRegister>
<DocumentID> 4FB6BB00-3347-11d0-B40A-00AA005FF586 </DocumentID>
<PolicyID>0002</PolicyID>
<UserID>fx17691</UserID>
<Date> 2007-02-20T23:59:59+09:00 </Date >
</ PolicyRegister>
```

FIG. 12

EXAMPLE SECURITY POLICY SUMMARY RESPONSE

```
<Policies>
<PolicyID>0001</PolicyID>
<Name>IN-SECTION REFERENCE FOR SOFTWARE
DEVELOPMENT SECTION</Name>
<AccessRight>
<Users><Group>SOFTWARE DEVELOPMENT
SECTION</Group></Users>
<ValidTerm> 180days from creation</ValidTerm>
<Operations>
<View/><Print/><Copy/>
</Operations >
</AccessRight>
<AccessRight>
<Users><User>Owner</User></Users>
<ValidTerm> </ValidTerm>
<Operations>
<View/><Print/><Copy/><Edit/><Scan/>
</Operations >
</AccessRight>
<Policy> ...</Policy>
</Policies>
```

FIG. 13

EXAMPLE SECURITY POLICY SEARCH RESULT

<UsageRights>
  <UserID>fx17691</UserID>
  <PolicyID>0002</PolicyID>
  <DocumentID> 4FB6BB00-3347-11d0-B40A-00AA005FF586 </DocumentID>
  <ValidTo> 2007-02-20T23:59:59+09:00 </ValidTo>
  <Operations>
  <View/>
  <Print/>
  <Copy/>
  </Operations >
</UsageRights>

FIG. 15

EXAMPLE SECURITY POLICY SWITCHING REQUEST

<PolicySwich>
  <DocumentID> 4FB6BB00-3347-11d0-B40A-00AA005FF586 </DocumentID>
  <PolicyID>0003</PolicyID>
  <UserID>fx17691</UserID>
</ PolicySwitch>

ANOTHER EXAMPLE DATA STRUCTURE OF SECURITY POLICY DB

| POLICY ID | POLICY NAME | USAGE RANGE | VALID TERM | PERMITTED FUNCTION LIST |
|---|---|---|---|---|
| 0001 | IN-SECTION REFERENCE FOR SOFTWARE DEVELOP- MENT SECTION | MEMBER ORGANIZATION: SOFTWARE DEVELOPMENT SECTION | 180 DAYS FROM CREATION | VIEW OF ELECTRONIC DOCUMENT PRINT OF ELECTRONIC DOCUMENT COPY OF PAPER DOCUMENT SWITCH OF POLICY:0003 |
|  |  | CREATOR | NO LIMITED DURATION | VIEW OF ELECTRONIC DOCUMENT EDIT OF ELECTRONIC DOCUMENT PRINT OF ELECTRONIC DOCUMENT COPY OF PAPER DOCUMENT SCAN OF PAPER DOCUMENT SWITCH OF POLICY:0003 |
| 0002 | SALES REFERENCE | NO LIMITED RANGE | 30 DAYS FROM CREATION | VIEW OF ELECTRONIC DOCUMENT |
|  |  | MEMBER ORGANIZATION: SALES SECTION | 180 DAYS FROM CREATION | VIEW OF ELECTRONIC DOCUMENT EDIT OF ELECTRONIC DOCUMENT COPY OF PAPER DOCUMENT |
|  |  | CREATOR | NO LIMITED DURATION | VIEW OF ELECTRONIC DOCUMENT EDIT OF ELECTRONIC DOCUMENT PRINT OF ELECTRONIC DOCUMENT COPY OF PAPER DOCUMENT SCAN OF PAPER DOCUMENT SWITCH OF POLICY:0004 |
| ... | ... |  | ... | ... |

SECURITY POLICY SWITCHING DEVICE, SECURITY POLICY MANAGEMENT SYSTEM, AND STORAGE MEDIUM

CROSS-REFERENCE TO RELATED APPLICATIONS

This application is based on and claims priority under 35 USC 119 from Japanese Patent Application No. 2007-332062 filed on Dec. 25, 2007.

BACKGROUND

1. Technical Field

The present invention relates to a security policy switching device, a security policy management system, and a recording medium.

2. Related Art

Currently, many companies define a basic policy for information security, that is, a security policy (hereinafter also simply referred to as "policy") and manage data such as electronic documents according to the security policy. In such a company, for example, a technique known as DRM (Document Rights Management) can be used to attach, for each user, an access right for access control such as a valid term, printable/non-printable status, and editable/non-editable status of individual electronic documents. In addition, with the use of the DRM, a setting may be employed in which a common policy is created in a server in advance, and multiple different electronic documents are protected through a same policy (common policy). By defining a policy to be commonly used within an organization in this manner, it is possible to realize management to apply the common policy to all documents in the organization.

However, in the related art, there has been a problem in that it is not possible to manage in a manner that allows a change of a policy for only a particular document among the multiple documents protected under one policy.

SUMMARY

According to one aspect of the present invention, there is provided a security policy switching device having a policy information storage that stores policy setting information and identification information of a policy in correspondence to each other, the policy setting information including setting content of the policy and identification information of a user to whom the policy is attached, a data information storage that stores identification information of data for which a policy is set and identification information of a policy attached to the data, in correspondence to each other, and a policy switching unit that switches, in response to a switching request designating identification information of data for which the policy is to be switched and identification information of a user instructing the switch, a policy attached to the data by updating identification information of the policy attached to the data stored in the data information storage with identification information of another policy.

BRIEF DESCRIPTION OF THE DRAWINGS

Exemplary embodiments of the present invention will be described in detail based on the following figures, wherein:

FIG. 5 is a diagram showing an example data structure of a security policy database in an exemplary embodiment according to the present invention;

FIG. 6 is a diagram showing an example data structure of a document information database in an exemplary embodiment according to the present invention;

FIG. 12 is a diagram showing an example of a registering request of a security policy sent from an external device in an exemplary embodiment according to the present invention;

FIG. 13 is a diagram showing an example of a policy summary list created by a security policy server in an exemplary embodiment according to the present invention;

FIG. 15 is a diagram showing an example search result obtained by a security policy search process in an exemplary embodiment according to the present invention;

FIG. 17 is a diagram showing an example switching request of a security policy sent from an external device in an exemplary embodiment according to the present invention;

FIG. 29 is a diagram showing another example data structure of a security policy database in an exemplary embodiment according to the present invention.

DETAILED DESCRIPTION

Exemplary embodiments of the present invention will now be described with reference to the drawings.

Figure 1:
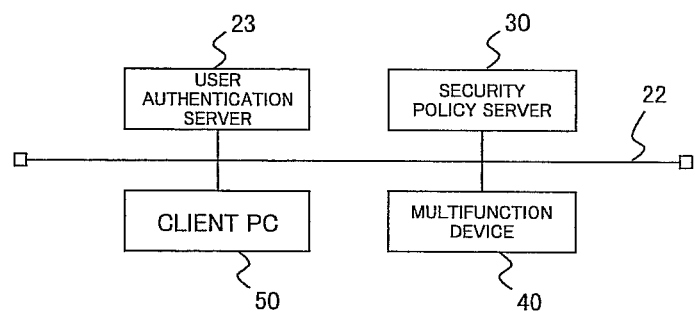
FIG. 1 is a diagram showing an overall structure of an exemplary embodiment of a security policy management system according to the present invention.

FIG. 1 is an overall structural diagram showing an exemplary embodiment of a security policy management system according to the present invention. FIG. 1 shows a structure in which a user authentication server 23, a security policy server 30, a personal computer (PC) which becomes a client (hereinafter, "client PC") 50, and a multifunction device 40 are connected to a LAN (Local Area Network) 22 which is a form of network. Although FIG. 1 shows one client PC 50 and one multifunction device 40, alternatively, it is also possible to connect multiple client PCs 50 and/or multiple multifunction devices 40 to the LAN 22.

In FIG. 1, the user authentication server 23 is a server computer which collectively manages user authentication. In the other devices such as the client PC 50, the devices are controlled so that the use of the device is allowed after authentication of the user. The device requests user authentication from the user authentication server 23. The user authentication server 23 may be an LDAP (Lightweight Directory Access Protocol) server or a server such as Windows (registered trademark) Active Directory.

The security policy server 30 operates as a policy switching device, and also has a function to manage an access right for an electronic document and a paper document protected by the security handled by the present system (hereinafter collectively referred to as "protected document").

The client PC 50 communicates with the security policy server 30 and creates an electronic document which is protected (hereinafter also referred to as a "protected electronic document") by attaching a security policy to a document which is not protected. In addition, on the client PC 50, a document application which executes a process such as viewing, printing, and editing on a protected electronic document operates within a scope permitted in the security policy. The client PC 50 further has a switching function of an already-existing policy of the protected electronic document.

The multifunction device 40 is a form of image processor on which multiple functions are provided. The multifunction device 40 in the present exemplary embodiment has a print function and a copy function as basic functions. In the present system, in addition to these basic functions, because the multifunction device 40 has a built-in computer, the multifunction device 40 can operate as a client computer similar to the client PC 50, and communicates with the security policy server 30, to provide functions such as printing of a protected electronic document and copying and scanning of a paper document which is protected (hereinafter also referred to as a "protected paper document") in a scope permitted in the policy. In addition, the multifunction device 40 has a switching function of an already-existing policy of a protected paper document.

A protected document handled in the present exemplary embodiment will next be described. In the present exemplary embodiment, as described above, a document to which a security policy is attached and in which operation is restricted is called a protected document. The protected document includes two types: an electronic document and a paper document. In either case, on the security policy server 30, the protected document is correlated to a particular policy, identification information of the document (document ID) is attached, and the document is managed.

Figure 2:
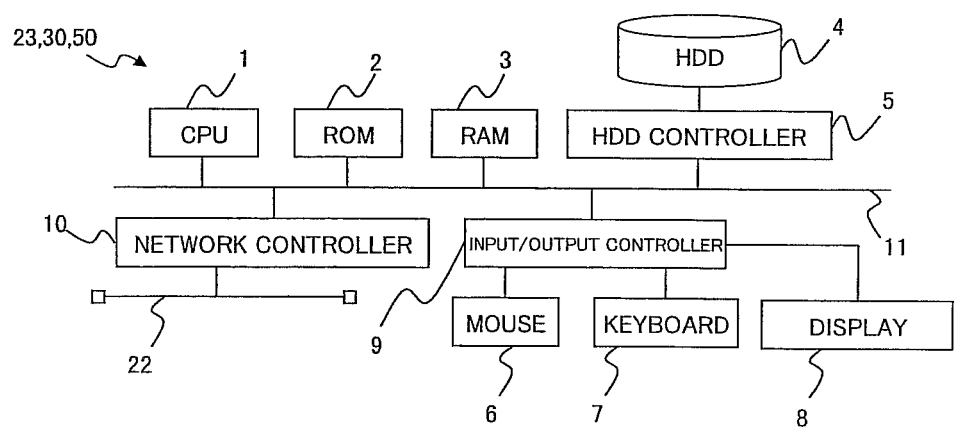
FIG. 2 is a diagram showing a hardware structure of a server computer which forms a security policy server in an exemplary embodiment according to the present invention.

FIG. 2 is a hardware structural diagram of a server computer forming the security policy server 30 in the present exemplary embodiment. The security policy server 30 in the present exemplary embodiment can be realized with a general-purpose hardware structure which already exists. That is, the computer is constructed by connecting, to an internal bus 11, a CPU 1, a ROM 2, a RAM 3, an HDD controller 5 to which a hard disk drive (HDD) 4 is connected, an input/output controller 9 to which a mouse 6 and a keyboard 7 which are provided as input units and a display 8 provided as a display device are connected, and a network controller 10 provided as a communication unit.

Although the performances may differ, the user authentication server 23 and the client PC 50 are also formed with computers, and thus the hardware structures of these units are similar to that shown in FIG. 2.

Figure 3:
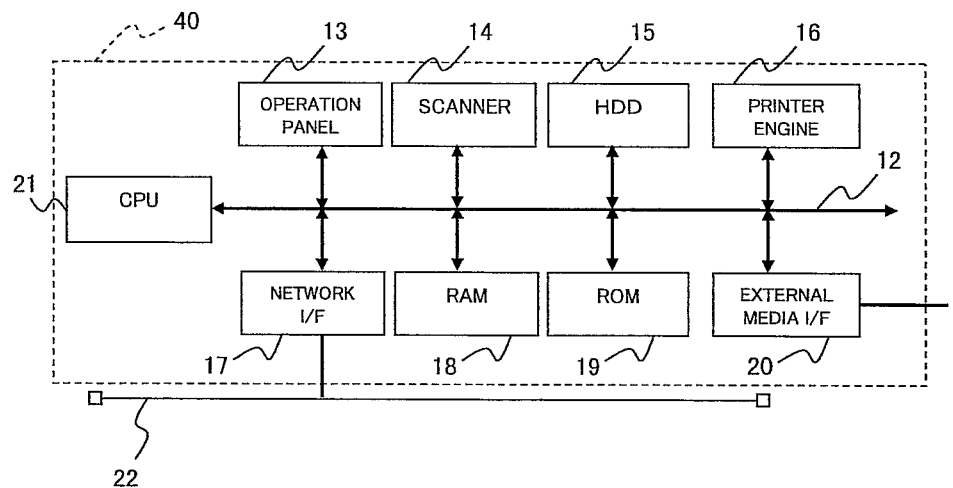
FIG. 3 is a diagram showing a hardware structure of a multifunction device in an exemplary embodiment according to the present invention.

FIG. 3 is a hardware structural diagram of the multifunction device 40 in the present exemplary embodiment. As described above, the multifunction device 40 is a multifunction device on which various functions such as a copy function and a scan function are provided, and has a built-in computer. In FIG. 3, a CPU 21 controls operations of various mechanisms equipped in the multifunction device 40 such as a scanner 14 and a printer engine 16 according to a program stored in a ROM 19. An address data bus 12 enables communication of data through connection with various mechanisms to be controlled by the CPU 21. An operation panel 13 receives an instruction from a user and displays information. A scanner 14 reads a document which is set by the user and stored in an HDD 15 or the like as electronic data. The HDD 15 stores the electronic document or the like which is read using the scanner 14. A private box is also provided in the HDD 15. The printer engine 16 prints an image on output paper according to an instruction from a control program which is executed by the CPU 21. A network interface (I/F) 17 connects the LAN 22, and is used for transmission of electronic data created by the multifunction device 40, reception of an electronic mail transmitted and destined for the multifunction device 40, and access to the multifunction device 40 via a browser. A RAM 18 is used as a work memory during execution of a program and a communication buffer during transmission and reception of electronic data. The ROM 19 stores various programs related to control of the multifunction device 40, encryption of the electronic data, and transmission and reception of the electronic data. With execution of various programs, the constituent elements to be described later achieve predetermined processing functions. An external media interface (I/F) 20 is an interface with an external memory device such as a USB memory and a flash memory.

Figure 4:
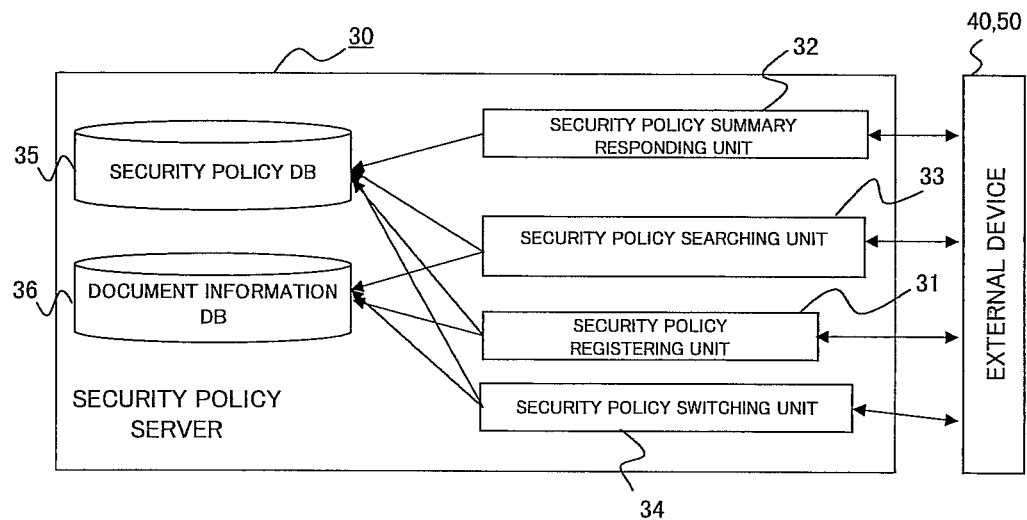
FIG. 4 is a diagram showing a block structure of a security policy server in an exemplary embodiment according to the present invention.

FIG. 4 is a block structural diagram of the security policy server 30 in the present exemplary embodiment. FIG. 4 shows a security policy registering unit 31, a security policy summary responding unit 32, a security policy searching unit 33, a security policy switching unit 34, a security policy database (DB) 35, and a document information database (DB). The security policy registering unit 31 adds, in response to a registering request transmitted from the multifunction device 40 and the client PC 50 (hereinafter collectively referred to as "external device"), item data including a document ID, a policy ID, a creator ID, and a creation date and time designated in the registering request, to the document information database 36 as a new record. In the present exemplary embodiment, the document ID is uniquely created. In other words, because a UUID (Universally Unique IDentifier) is used, it is not necessary to check whether or not there is data of the designated document ID in the database. Alternatively, a configuration may be employed in which such a checking process is executed.

In the present exemplary embodiment, a security policy summary response is a function to reference a summary list to see which policy can be attached when an external device attaches a policy on the document. The security policy summary responding unit 32 searches policy data registered in the security policy database 35 in response to the inquiry, creates a summary list of policies that match the search condition, and returns the summary list to the inquiring device. It is also possible to employ a configuration in which, when the external device requests the policy from the security policy server 30, the external device designates a user ID for which a policy is to be attached. In this case, it is possible to check whether or not the user is included in a list of users who can be registered which is determined in advance, or to provide a list, for each policy, of users for whom registration of the policy is permitted, and check this list.

In the present exemplary embodiment, the security policy search is a function for the external device to request information of a security policy related to a document for which a policy is already set. In this process, the external device requests security policy information while designating the document ID of the document in question and the user ID of the requesting user, and the security policy searching unit 33 returns the policies corresponding to the request to the requesting device.

The security policy switching unit 34 switches the policy attached to the document in response to a switching request from an external device. The switching request designates a document ID of the document for which the policy is to be switched, a policy ID of the policy to be switched, and a user ID of a user instructing the switch.

The security policy server 30 has the security policy database 35 as a database for managing a security policy (what right is to be permitted to whom) and the document information database 36 as a database for managing document information (which document is assigned to which security policy, when the document is created by whom, etc.). Details of the databases 35 and 36 will now be described with reference to FIGS. 5 and 6.

FIG. 5 is a diagram showing an example data structure of the security policy database 35 in the present exemplary embodiment. In the security policy database 35, policy information is registered in which policy setting information including a usage range, a valid term which is set for each usage range, and a permitted function list, is correlated to a policy ID for identifying a policy and a name of the policy. The usage range is a user group which is managed in the user authentication server 23. Each user group includes at least one user. The valid term is a valid term of the document to which the policy is attached. A description format for the valid term is not limited to the number of elapsed days from creation as exemplified in FIG. 5, and may be set by various methods including the expiration period (date and time) of the valid term. The permitted function list is an operation permitted to the users in the usage range. For example, in FIG. 5, for the case of the policy ID of "0001", if a person who belongs to a software development section and who is not the creator of the document accesses a protected document having this policy attached, that person is permitted to view and print an electronic document, copy a paper document, and switch the policy within 180 days from the time of creation of the document. The creation date and time of the document can be identified based on the registered content in the document information database 36. Once a document is protected, the document ID is maintained even when the form is changed, regardless of whether it is a electronic document or a paper document. In other words, when a protected paper document is created by editing and printing an electronic document or when a protected electronic document is created by copying or scanning a paper document, the same document ID is assigned to the newly created protected paper document or the newly created protected electronic document. In this manner, the same policy is applied to the document created by the operation.

FIG. 6 is a diagram showing an example data structure of the document information database 36 in the present exemplary embodiment. In the present exemplary embodiment, a document is handled as data for which policy is set, and the document information database 36 is thus provided as the data information storage. In the document information database 36, a document ID which is an identifier of the document (in the case of this example configuration, represented with UUID), a policy ID of a security policy followed by the document, the user ID of the user creating the document (creator ID), and an operation date and time of the document, more accurately, the date and time when the policy is attached to the created document, are registered in correspondence to each other. For example, in the case of the document on the third row in FIG. 6 (a record starting with a document ID of "AED6"), the document is created by a user, to whom a user ID of "fx25615" is assigned, attaching a policy of policy ID "0002" on Oct. 3, 2006, 14:23. Such a policy database and document information database can be realized with existing technologies, and the data structure is not limited to the data structure exemplified in FIG. 6, as long as the data structure allows attachment of a security policy for each document.

The constituent elements 31-34 in the security policy server 30 are realized by cooperation of a computer equipped in the security policy server 30 and a program executed by the CPU 1 equipped in the computer. The databases 35 and 36 are realized with the HDD 4 equipped in the computer.

Figure 7:
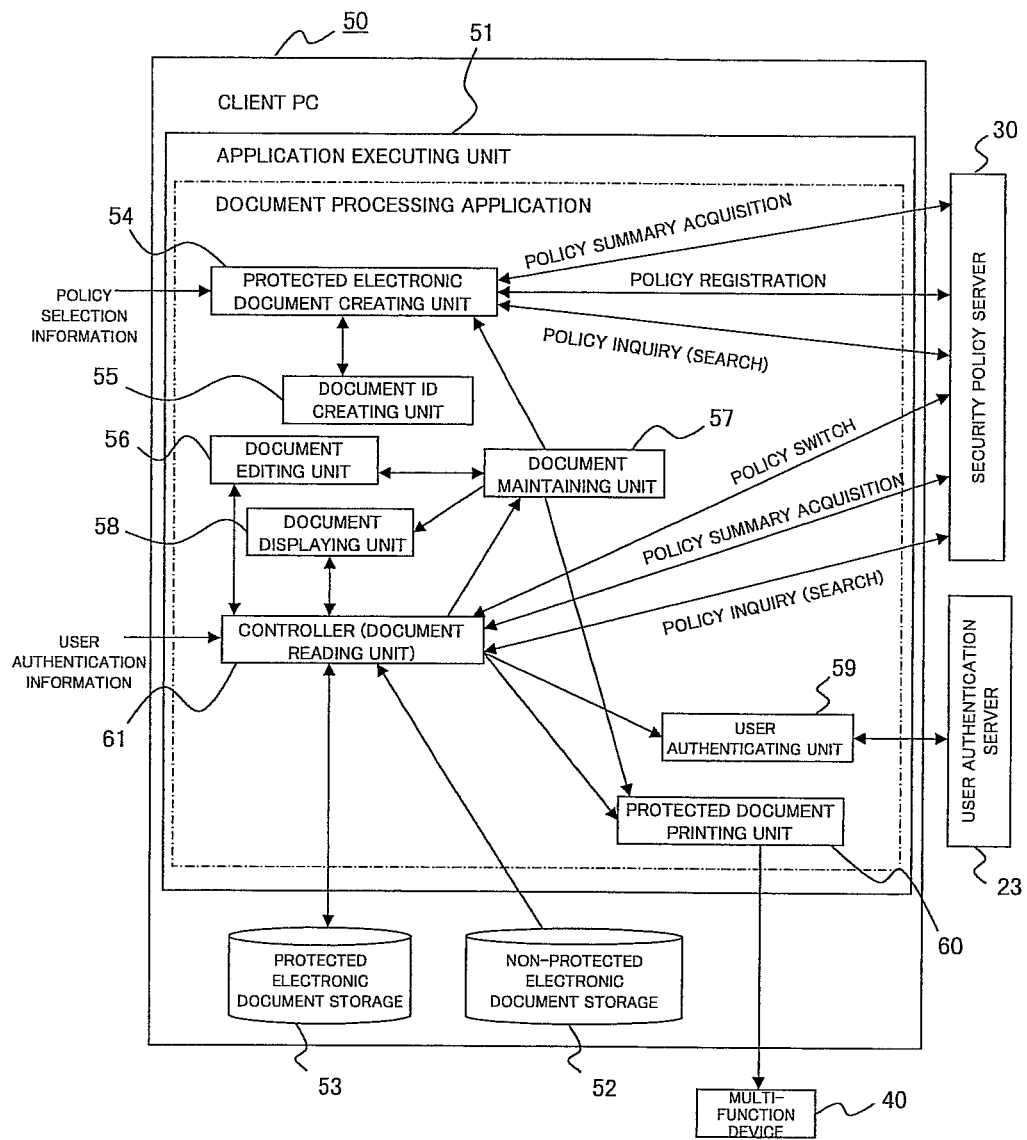
FIG. 7 is a block diagram showing a structure of a client PC in an exemplary embodiment according to the present invention.

FIG. 7 is a block structural diagram of the client PC 50 in the present exemplary embodiment. The client PC 50 used by a normal user executes an operation of protection of an electronic document or editing, printing, or the like of a protected electronic document within a scope of right permitted in the policy, through execution of a predetermined document processing application. The client PC 50 has an application executing unit 51 which executes an application, a non-protected electronic document storage 52 which stores an electronic document which is not protected, and a protected electronic document storage 53 which stores an electronic document which is protected. The application executing unit 51 communicates with the security policy server 30, and executes the document processing application including a constituting element to be described later, to provide functions such as protection of a non-protected electronic document and viewing, editing, and printing of a protected electronic document.

More specifically, a protected electronic document creating unit 54 sets a policy on a non-protected electronic document and creates a protected electronic document. A document ID creating unit 55 creates a document ID to be assigned to the protected document to be newly created. A document editing unit 56 applies editing on an electronic document which is read from each of the storages 52 and 53 or to an electronic document sent from the outside, according to an instruction by user operation. A document maintaining unit 57 temporarily maintains an edited electronic document. While the other constituent elements are realized by software loaded on the RAM 3, the document maintaining unit 57 is realized by the RAM 3. A document displaying unit 58 displays an electronic document to be viewed and an electronic document to be edited on the display 8. A user authenticating unit 59 executes a user authentication process at the start of use of the client PC 50. A protected document printing unit 60 executes printing of a protected document. A controller 61 controls operations of the overall structure of the constituent elements, and provide functions of the document processing application. The controller 61 also functions as a document reading unit which reads an electronic document stored in each of the storages 52 and 53.

The constituent elements 54-56 and 58-61 in the client PC 50 are realized by cooperation of a PC forming the client PC 50 and a program which is executed by the CPU 1 equipped in the PC. The storage 52 and 53 are realized by the HDD 4 equipped in the client PC 50.

Figure 8:
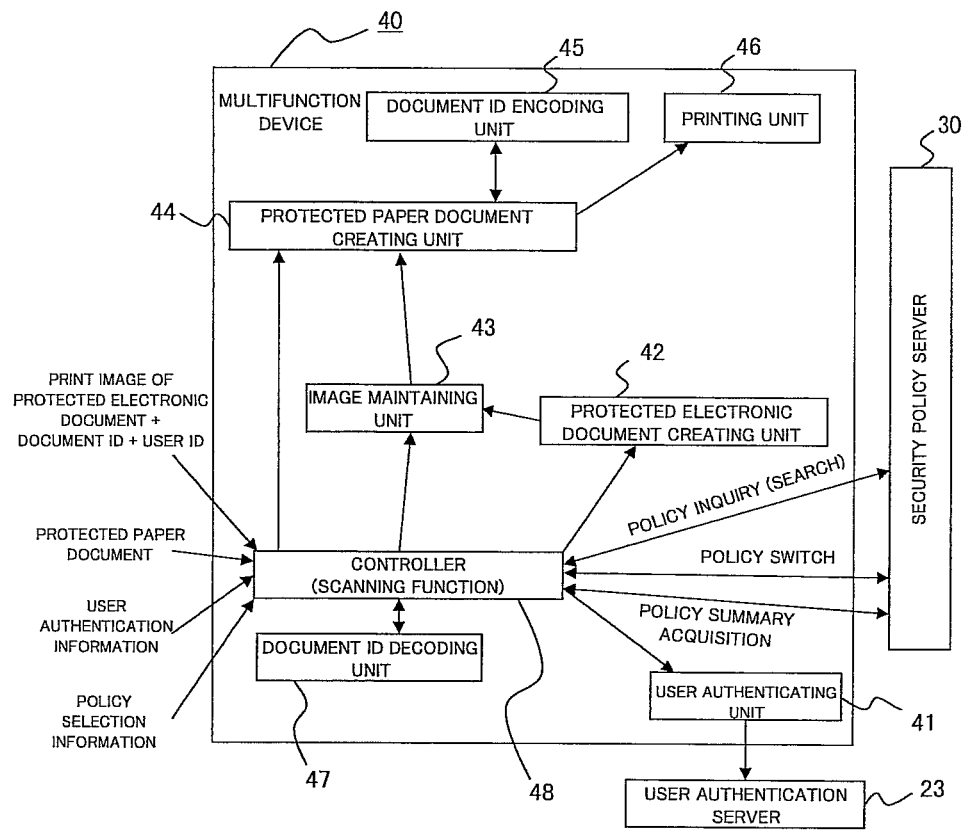
FIG. 8 is a block diagram showing a structure of a multifunction device in an exemplary embodiment according to the present invention.

FIG. 8 is a block structural diagram of the multifunction device 40 in the present exemplary embodiment. The multifunction device 40 provides a printing function of a protected electronic document and copying and scanning functions of a protected paper document. The multifunction device 40 includes a user authenticating unit 41, a protected electronic document creating unit 42, an image maintaining unit 43, a protected paper document creating unit 44, a document ID encoding unit 45, a printing unit 46, a document ID decoding unit 47, and a controller 48. The user authenticating unit 41 executes a user authentication process at a start of use of the multifunction device 40. The protected electronic document creating unit 42 sets a policy on a protected paper document which is read by scanning, and creates a protected electronic document. The image maintaining unit 43 temporarily maintains a created protected electronic document. While the other constituent elements are realized by software loaded on the RAM 18, the image maintaining unit 43 is realized by the RAM 18. The protected paper document creating unit 44 cooperates with the document ID encoding unit 45 and the printing unit 46, and creates a protected electronic document to be printed by the printing unit 46, based on a protected electronic document. The document ID encoding unit 45 encodes document ID data included in the protected electronic document to image data which can be printed on paper. The printing unit 46 prints the created protected paper document. The document ID decoding unit 47 decodes read image data of a protected paper document which is read by the scanner 14 and extracts a document ID. The controller 48 controls operations of the constituent elements, to realize cooperation with the hardware such as the scanner 14, and provides various functions of the multifunction device 40 related to the switching of the document policy.

The constituent elements 41-42 and 44-48 in the multifunction device 40 are realized by cooperation of a computer equipped in the multifunction device 40 and a program executed by the CPU 21 equipped in the computer. The image maintaining unit 43 is realized by the RAM 18.

The program used in the present exemplary embodiment may be provided by a communication unit or may be provided stored in a computer-readable storage medium such as a CD-ROM or a DVD-ROM. The program provided from the communication unit or storage medium is installed in the computer, and various processes are realized by the CPU of the computer sequentially executing the installed program.

Figure 9:
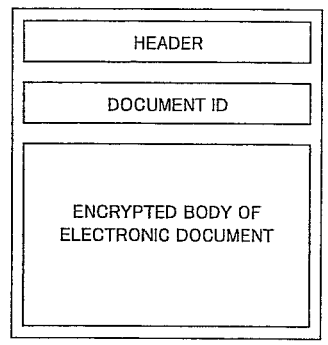
FIG. 9 is a diagram showing an example data structure of a protected electronic document used in an exemplary embodiment according to the present invention.

FIG. 9 is a diagram showing an example data structure of a protected electronic document used in the present exemplary embodiment. The protected electronic document includes a header (a byte sequence of a predetermined length) showing that the data is a protected electronic document, a document ID, and an encrypted body of the electronic document. In the present exemplary embodiment, the protected electronic document is assumed to be encrypted with an encryption key common to all electronic documents, but such a configuration is only exemplary, and the key may be changed for each document such as in the DRM technique. In order to prevent intentional replacement of the document ID with a document ID of another document, an electronic signature may be attached to the overall electronic document, or a value such as HMAC (Keyed-Hashing for Message Authentication Code) may be attached. In either case, in the present system, there is no further limitation other than that all protected documents are identified with identifiers, and that the protected documents are managed with policies.

Figure 10:
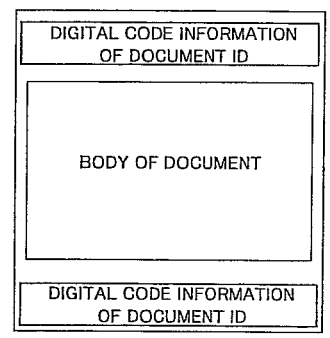
FIG. 10 is a schematic diagram showing an example when a protected paper document is printed on paper in an exemplary embodiment according to the present invention.
Figure 11:
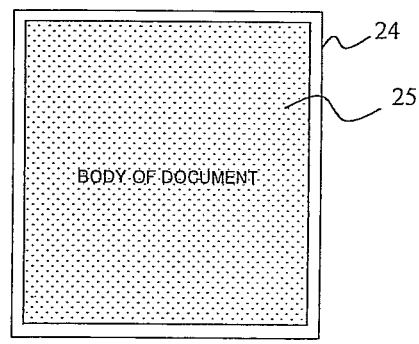
FIG. 11 is a schematic diagram showing another example when a protected paper document is printed on paper in an exemplary embodiment according to the present invention.

FIGS. 10 and 11 are schematic diagrams showing examples when a protected paper document used in the present exemplary embodiment is printed on paper. FIG. 10 is an example of a case in which the document ID is printed in a specific code pattern such as a barcode and a QR code in upper and lower sections (header and footer) of the paper on which the document is printed. FIG. 11 shows a case in which the document ID is embedded through a watermark 25 as a background of the overall document on a printing medium 24 such as paper. In either case, it is sufficient as long as the document ID is printed on the paper itself in a method which enables reading of the document ID at a later time.

Next, an operation in the present exemplary embodiment will be described for each device in the order of the security policy server 30, the client PC 50, and the multifunction device 40.

1. Operation of Security Policy Server 30

The security policy server 30 provides 4 functions including registration, summary, search, and switch of security policy for the external devices 40 and 50. These processes will now be described.

1.1 Security Policy Registration

When the security policy registering unit 31 is called by the external device sending a registering request designating data of a document ID, a policy ID, a creator ID, and a creation date and time, the security policy registering unit 31 adds the data in the document information database 36 as a new record. The security policy registering unit 31 returns the result of the registration process (TRUE or FALSE) to the origin of the registering request. Alternatively, in place of the creation date and time, a date and time when the registering request is received or a date and time of completion of the registration in the database may be employed. FIG. 12 shows an example registering request of the security policy sent from the external device.

1.2 Security Policy Summary Response

As described above, a security policy summary response is a function for an external device to inquire a summary list showing which policy can be attached, when the external device attaches a policy to the document.

When the security policy summary responding unit 32 is called by the external device sending a policy summary acquiring request, the security policy summary responding unit 32 searches policy data registered in the security policy database 35, creates a summary list of policies, and returns the summary list to the origin of the request. When the summary list cannot be created, the security policy summary responding unit 32 may respond accordingly ("FALSE").

When the external device sends a request to the security policy server 30, the user may request designation of a user ID or the like for which a policy is to be attached, as a request condition, so that the user can instruct that only the records matching the inquiry condition be included in the summary list. FIG. 13 shows an example summary list returned from the security policy summary responding unit 32 to the origin of the policy summary acquiring request.

1.3 Security Policy Search

Figure 14:
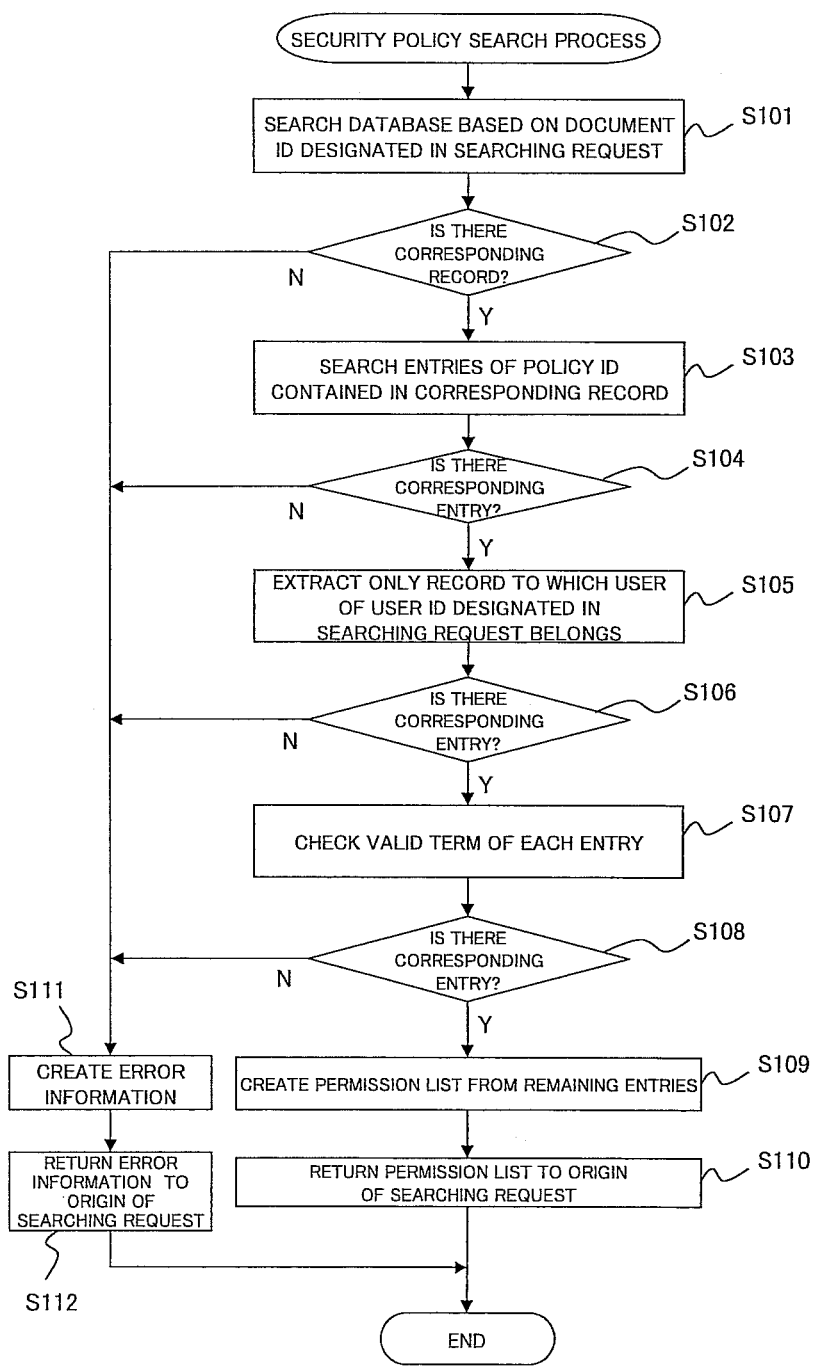
FIG. 14 is a flowchart showing a security policy search process in an exemplary embodiment according to the present invention.

As described above, a security policy search is a function for the external device to request information of a security policy related to a document for which a policy is already set. The security policy search process will now be described with reference to a flowchart shown in FIG. 14.

When a security policy searching unit 33 is called by a searching request from an external device, the security policy searching unit 33 first searches the document information database 36 based on the document ID designated in the searching request (step 101). When a corresponding record is acquired (Y in step 102), the security policy searching unit 33 searches the security policy database 35 for an entry of the policy ID included in the record (step 103). When a corresponding entry is acquired (Y in step 104), the security policy searching unit 33 refers to the usage range of the entry, and filters and extracts only the user group to which the user of the user ID designated in the searching request belongs (step 105). For example, when the inquiring user is not the creator and belongs to a software development section in the policy ID "0001" of FIG. 5, only the software development section is extracted. The determination of whether or not a user is a creator is made based on whether or not the creator ID of the designated document matches the user ID of the requesting user. If nothing is found, a null (NULL) is returned.

When a user group to which the user belongs is extracted (Y in step 106), the valid term for each extracted entry is checked (step 107). In other words, for the item of the usage range of each extracted entry, a valid term expiration date is created based on the creation date and time of the entry of the document ID. If the valid term expiration date is earlier than the current time, the entry is deleted from the extracted entries. If one or more entries remain (Y in step 108), a permission list is created (step 109). If only one entry remains, the entry is used as the permission list. When multiple entries remain, the permitted lists of the items of the remaining usage ranges are merged, to create a permission list. Regarding the valid term expiration date and time, the latest date and time is selected among the multiple entries.

The permission list thus created is returned to the external device transmitting the searching request as a search result (step 110). FIG. 15 shows an example policy search result returned to the origin of the searching request as a result of the above-described process. When there is no corresponding record or entry in the above-described process (N in step 102, N in step 104, N in step 106, or N in step 108), error information indicating no record or entry is found is created (step 111), and returned to the external device transmitting the searching request (step 112).

1.4 Security Policy Switch

When a switching request designating data of a document ID, an ID of the policy to be switched, and an ID of a user instructing the switch are sent from an external device, the security policy switching unit 34 executes the following switch process. The security policy switch process will now be described using a flowchart shown in FIG. 16. FIG. 17 shows an example switching request for security policy sent from the external device.

When the security policy switching unit 34 is called by a switching request from the external device, the security policy switching unit 34 first searches the document information database 36 based on the document ID designated in the switching request (step 121). When a corresponding record is acquired (Y in step 122), the security policy switching unit 34 searches the security policy database 35 for an entry of the policy ID included in the record (step 123). When a corresponding entry is acquired (Y in step 124), the security policy switching unit 34 refers to the usage range of the entry, and filters and extracts only a user group to which the user of the user ID designated in the switching request belongs (step 125). For example, when the requesting user is not a creator and belongs to the software development section in the policy ID "0001" of FIG. 5, only the software development section is extracted. The determination of whether or not the requesting user is a creator can be made by determining whether or not the creator ID of the designated document matches the user ID of the requesting user. When nothing is extracted, a failure (FALSE) is returned.

When a user group to which the user belongs is extracted (Y in step 126), presence/absence of authority for policy switch is checked for the extracted entry (step 127). In other words, it is checked whether or not "policy switch" corresponding to a policy switching right is included in the permitted function list of the extracted entry. If the "policy switch" is not included, a failure (FALSE) is returned.

When the entry has a policy switching right (Y in step 128), the security policy switching unit 34 compares a scope of right of the policy (hereinafter also referred to as "policy before switching") which is currently set for the document to be switched and a scope of right of a policy identified by the policy ID to be switched (hereinafter also referred to as "switching destination policy") (step 129). When, as a result of this comparison, it is determined that the scope of right of the policy before switching is wider than the scope of right of the switching destination policy (Y in step 130), the security policy switching unit 34 updates the policy ID of the entry of the document stored in the document information database 36 with the policy ID of the switching destination policy, to switch the policy attached to the document (step 131). If the scope is to be widened, a failure (FALSE) is returned.

The scope of right being wide means the following. In the permitted function list registered in the security policy database 35, operations permitted for the user belonging to the user group which is set in the usage range, more specifically, viewing, printing of the electronic document, etc. are set. When, for example, a right for "printing the electronic document" is not set in the policy before switching and the right for "printing the electronic document" is set in the switching destination policy, such a case corresponds to a "wider scope of right". If the policy attached to the document is switched to the switching destination policy in such a case, an authority which is not attached (the right to "print electronic document") would be newly attached to the user. In this manner, attachment, to the user, of the authority which has not been attached through switching of the policy, may result in attachment of an inappropriate authority. Therefore, such a case must be avoided. In other words, switching of policy attached to the protected document from the policy before switching to the switching destination policy is permitted only when the operations permitted based on the switching destination policy are restricted compared to the operations permitted based on the policy before switching. Therefore, the security policy switching unit 34 compares the scope of right of the policy before switching and the scope of the right of the switching destination policy, so that the attachment of unnecessary access rights to the user can be avoided. That is, the policy switch is permitted only when the policy to be attached, through the policy switching, for the user operating the document is the same or restricted compared to the current status. The comparison and determination of the scope of right are targeted to the following data. In the present exemplary embodiment, an access right is equivalent to an authority for operation for a protected document.

First, as exemplified in the above description, the criterion is whether or not a new right is added to the permitted function list designated in a same usage range (user group). Even if the number of attached rights is reduced by the policy switch, if a new authority is attached, the scope of the right is widened. When, however, an electronic document is to be edited, a right to "view the electronic document" is required. In this manner, there may be cases in which there is a priority, an order, or an inclusion relationship among the rights. In such cases, relationships between the access rights may be defined in advance, and the definition information may be referred to when the wideness of the scope of the right of the policy before switching and the scope of the right of the switching destination policy are to be judged.

Next, a criterion is whether or not a new user or a new user group is added in a user group defined as a usage range. New attachment of an authority, through policy switch, to a user to whom the authority has not been attached is inappropriate. With regard to the user group also, similar to the above with regard to the permitted function list, there may be cases where there is an order or an inclusion relationship. Thus, similar to the case of the permitted function list described above, relationships among users and groups to which the users belong may be defined in advance and the relationship may be referred when the wideness of the scopes of the right is judged.

Next, a criterion is whether or not the valid term designated in the same usage range is long. Unconditional extension of the valid term is inappropriate.

When the policy switch is completed without abnormality as a result of the above-described processes, this result (TRUE) is returned to the origin of the switching request as a processing result (step 132).

When, on the other hand, the switch is not possible in the switch process (N in step 122, N in step 124, N in step 126, N in step 128, or N in step 130), error information indicating that the switch is not possible (FALSE) is created (step 133), and returned to the external device transmitting the switching request (step 134).

2. Operation of Client PC 50

The client PC 50 executes an operation such as protection of an electronic document and editing and printing within a scope right permitted in the policy on a protected electronic document, through execution of a predetermined document processing application. The processes such as printing and editing of a non-protected document are similar to those in the related art, and will not be described here.

2.1 Creation of Protected Electronic Document

Figure 18:
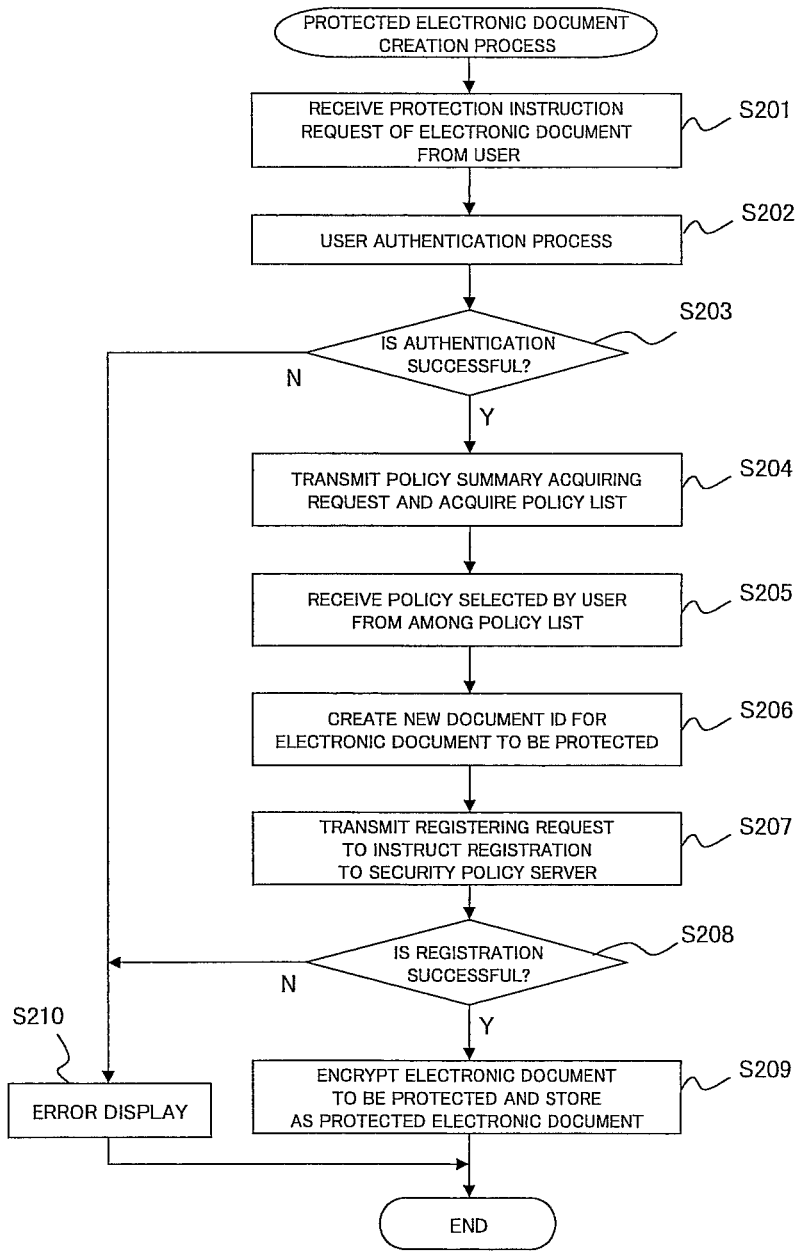
FIG. 18 is a flowchart showing a creation process of a protected electronic document in a client PC in an exemplary embodiment according to the present invention.

A creation process of a protected electronic document will now be described with reference to a flowchart shown in FIG. 18.

When a user who is using the client PC 50 inputs a protection instructing request designating an electronic document which is not protected, using an inputting unit such as a keyboard 7, the controller 61 receives the request (step 201). When a user ID and a password which are input when the user logs in the client PC 50 or a user ID and a password which are input by the user in response to a separate inputting request are sent to the user authenticating unit 59, the user authenticating unit 59 checks whether or not the input information is correct by inquiring to the external user authentication server 23 (step 202). When the user authentication is successful (Y in step 203), the user ID is maintained. When the user authentication fails (N in step 203), on the other hand, the failure is displayed on the display 8 (step 210) and the process is terminated.

After the user authentication is successful, the controller 61 instructs the document maintaining unit to maintain the non-protected electronic document by registering in the document maintaining unit 57, and calls the protected electronic document creating unit 54. The protected electronic document creating unit 54 transmits a policy summary acquiring request to the security policy server 30, to acquire a list of security policies (step 204). The processes executed on the side of the security policy server 30 in response to the transmitted policy summary acquiring request are already described in "1.2 Security Policy Summary Response". When a summary list of the policy is acquired, the controller 61 displays the acquired summary list of policy in a format which can be understood by the user (for example, a list display by a drop-down of policy name), and allows the user to select a policy to be applied. When a policy is selected, the controller 61 receive the selection (step 205), and then the protected electronic document creating unit 54 instructs the document ID creating unit 55 to create a document ID (step 206), creates a registering request including parameters of the document ID, a policy ID, a user ID (creator ID), and creation date and time (current time), and transmits the registering request to the security policy server 30, to instruct registration of the protected electronic document (step 207). The processes executed on the side of the security policy server 30 in response to the transmitted registering request are already described in "1.1 Security Policy Registration".

When it is recognized that the registration process is successful based on a processing result returned from the security policy server 30 in response to the registering instruction (Y in step 208), the controller 61 encrypts the non-protected document with a predetermined encryption key, correlates the assigned document ID, and writes and stores in the protected electronic document storage 53 as a protected electronic document (step 209).

When the authentication fails (N in step 203) or failure of registration process is returned from the security policy server 30 (N in step 208), the controller 61 notifies the user by, for example, displaying error information on the display 8 (step 210).

2.2 View of Protected Electronic Document

Figure 19:
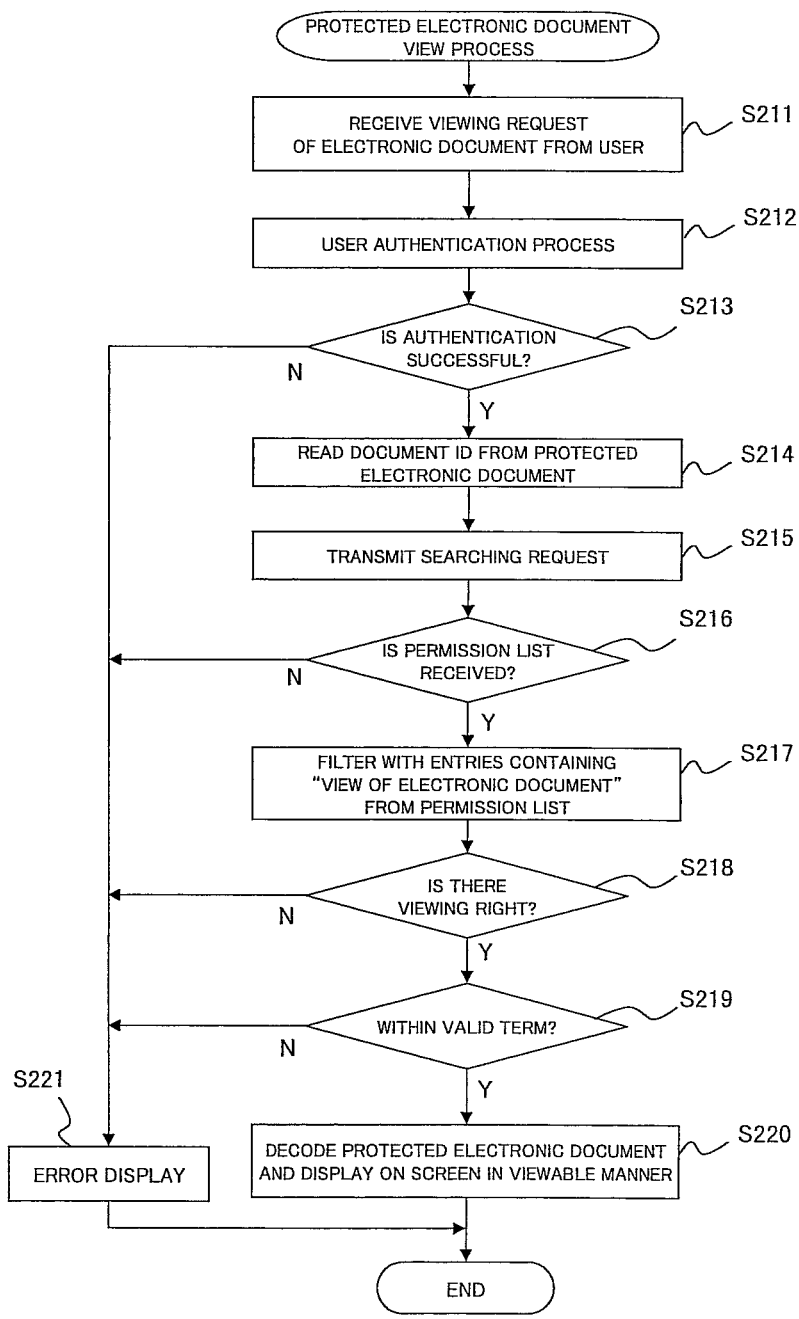
FIG. 19 is a flowchart showing a view process of a protected electronic document in a client PC in an exemplary embodiment according to the present invention.

Next, a view process of the protected electronic document will be described with reference to a flowchart shown in FIG. 19.

When viewing of a protected electronic document is requested by a user who is using the client PC 50 starting up a document processing application designating a protected electronic document using an inputting unit such as the keyboard 7 for view of the protected electronic document, the controller 61 receives the request (step 211), and instructs the user authenticating unit 59 to execute user authentication, similar to the protected electronic document creation process (step 212). After the user authentication is successful (Y in step 213), the controller 61 reads the document ID of the designated protected electronic document from the protected electronic document storage 53 (step 214), creates a searching request including parameters of the document ID and the user ID used for the user authentication, and transmits the request to the security policy server 30 (step 215). The processes executed on the side of the security policy server 30 in response to the transmitted searching request are already described in "1.3 Security Policy Search".

When error information indicating, for example, that there is no search result is transmitted from the security policy server 30 in response to the searching request (N in step 216), the controller 61 displays an error message such as "you do not have an access right for the designated document" on the display 8 and completes the process (step 221). When, on the other hand, the permission list is transmitted from the security policy server 30 as a search result (Y in step 216), the controller 61 refers to the permission list and filters the list with only the entries containing "view of electronic document" (step 217). In the example configuration of FIG. 15, only the entries containing "View" in the Operation tag are extracted. In addition, when the permission list is created by merging permitted function lists, the presence/absence of "View" is checked. If the "View" is not contained (N in step 218), it is determined that the viewing right for the designated protected electronic document is not attached to the user, and an error that "you do not have viewing right for designated document" is displayed on the display 8 (step 221).

When, on the other hand, "View" is contained (Y in step 218), the controller 61 then refers to the search result remaining through the filtering process, and checks whether or not there is an entry in which the valid term has expired. Because the security policy server 30 is configured to not return the entries for which the valid term has expired, this process functions as a double-checking process. When there is no entry for which the valid term has not expired (N in step 219), an error message that "valid term for the right for designated document has expired" is displayed and the process is completed (step 221).

When, on the other hand, there is an entry in which the valid term has not expired (Y in step 219), it is determined that the user has a viewing right, and the controller 61 decodes the body of the document with a predetermined decoding key, temporarily stores the decoded result along with the document ID in the document maintaining unit 57, calls the document displaying unit 58, and instructs the document to be displayed on the display 8 (step 220).

2.3 Edit of Protected Electronic Document

Figure 20:
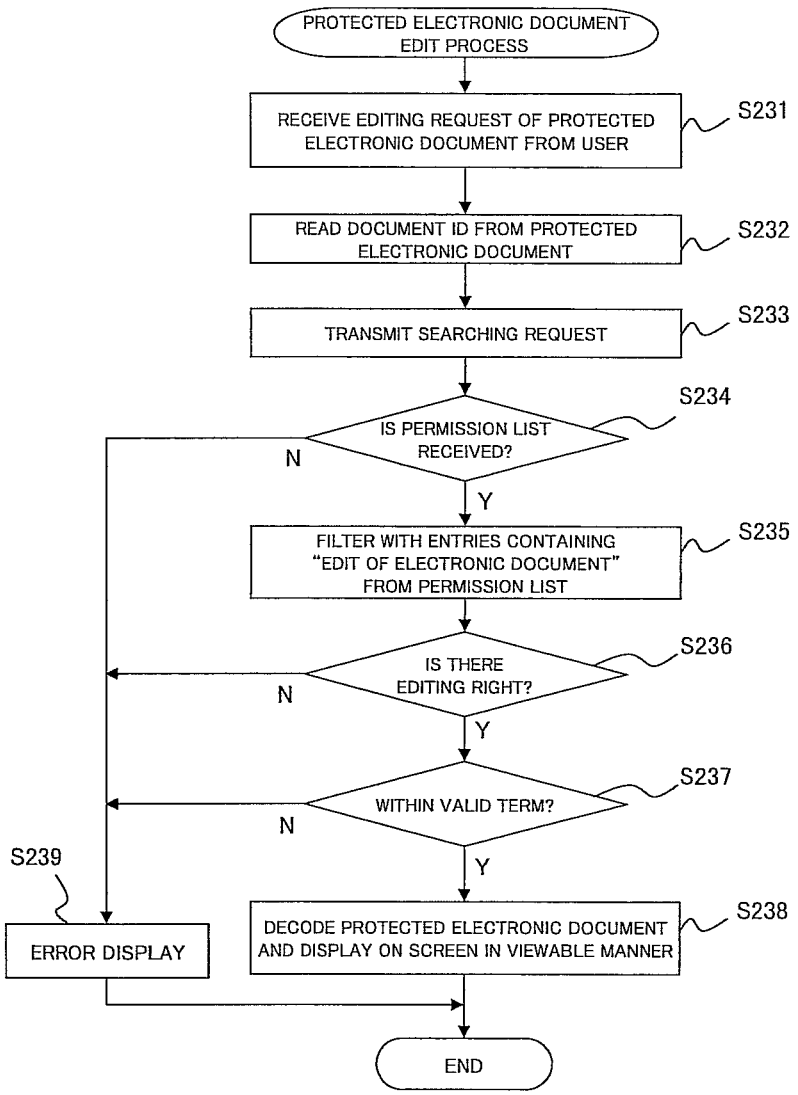
FIG. 20 is a flowchart showing an edit process of a protected electronic document in a client PC in an exemplary embodiment according to the present invention.

Next, an editing process of a protected electronic document will be described with reference to a flowchart shown in FIG. 20. Here, it is assumed that the document is already opened with a document processing application during editing. In other words, the editing process to be described below starts at a state in which a viewing process is executed and a document is already read to the document maintaining unit 57.

When editing of a protected electronic document is requested by a user opening the protected electronic document in the client PC 50, the controller 61 receives the request (step 231). The controller 61 reads the document ID from the protected electronic document (step 232), creates a searching request including parameters of the document ID and the user ID which is used for the user authentication, and transmits the request to the security policy server 30 (step 233). The processes executed on the side of the security policy server 30 in response to the transmitted searching request are already described in "1.3 Security Policy Search".

When error information such as indication that there is no search result is sent from the security policy server 30 in response to the searching request (N in step 234), the controller 61 displays an error message such as "you do not have access right for the designated document" on the display 8 and completes the process (step 239). When, on the other hand, a permission list is sent from the security policy server 30 as a search result (Y in step 234), the controller 61 refers to the permission list and filters the list with only the entries that contain "edit of electronic document" (step 235). In the example configuration of FIG. 15, only the entries that contain "Edit" in the Operation tag are extracted. When the permission list is created by merging permitted function lists, the presence/absence of "Edit" is checked. Here, if "Edit" is not contained (N in step 236), it is determined that an editing right for the designated protected electronic document is not attached to the user, and an error stating that "you do not have editing right for the designated document" is displayed on the display 8 (step 239).

When "Edit" is contained (Y in step 236), the controller 61 next refers to the search result remaining after the filtering process and checks whether or not there is a policy for which the valid term has not expired. Because the security policy server 30 is configured to not return policies for which the valid term has expired, this process functions as a double-check process. If there is no policy for which the valid term has not expired (N in step 237), an error message that "valid term of right for designated document has expired" is displayed and the process is completed (step 239).

When there is a policy for which the valid term has not expired (Y in step 237), it is determined that the user has an editing right, and the controller 61 calls the document editing unit 56 and permits editing of the protected electronic document to the user (step 238).

Alternatively, a configuration may be employed in which, when policy of the protected electronic document is requested from the security policy server 30 when the document is opened (viewed), the result of the request is maintained in the RAM 3. With such a configuration, the request of permission list in step 233 is not necessary, and the policy maintained in the RAM 3 may be referred to.

2.4 Print of Protected Electronic Document

Figure 21:
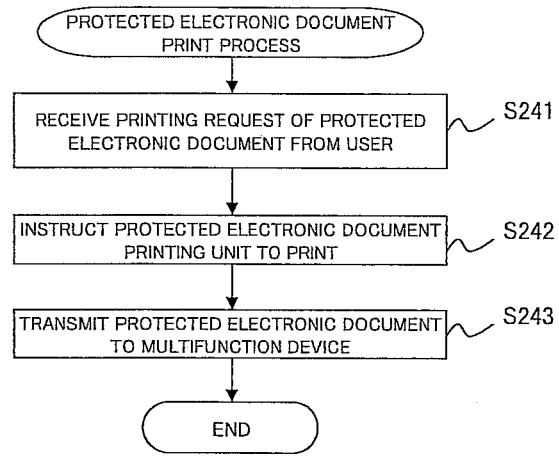
FIG. 21 is a flowchart showing a print process of a protected electronic document in a client PC in an exemplary embodiment according to the present invention.

Next, a printing process of a protected electronic document will be described with reference to a flowchart shown in FIG. 21. During printing, it is assumed that the document is already opened by a document application, similar to the case of editing. In other words, the printing process to be described below starts from a state in which the viewing process is executed and a document is already read in the document maintaining unit 57.

When a user opening a protected electronic document in the client PC 50 requests printing of the protected electronic document, the controller 61 receives the printing request (step 241), and sends a printing instruction of the protected electronic document designated by the user to the protected document printing unit 60 (step 242). The protected document printing unit 60 receiving the printing instruction reads the protected electronic document maintained in the document maintaining unit 57, converts the read document into a print image, and instructs the multifunction device 40 designated by the user to print the document by transmitting the protected electronic document along with the document ID and the user ID (step 243). The multifunction device 40 starts a printing process when the multifunction device 40 receives the protected electronic document. This process will be described later.

Figure 22:
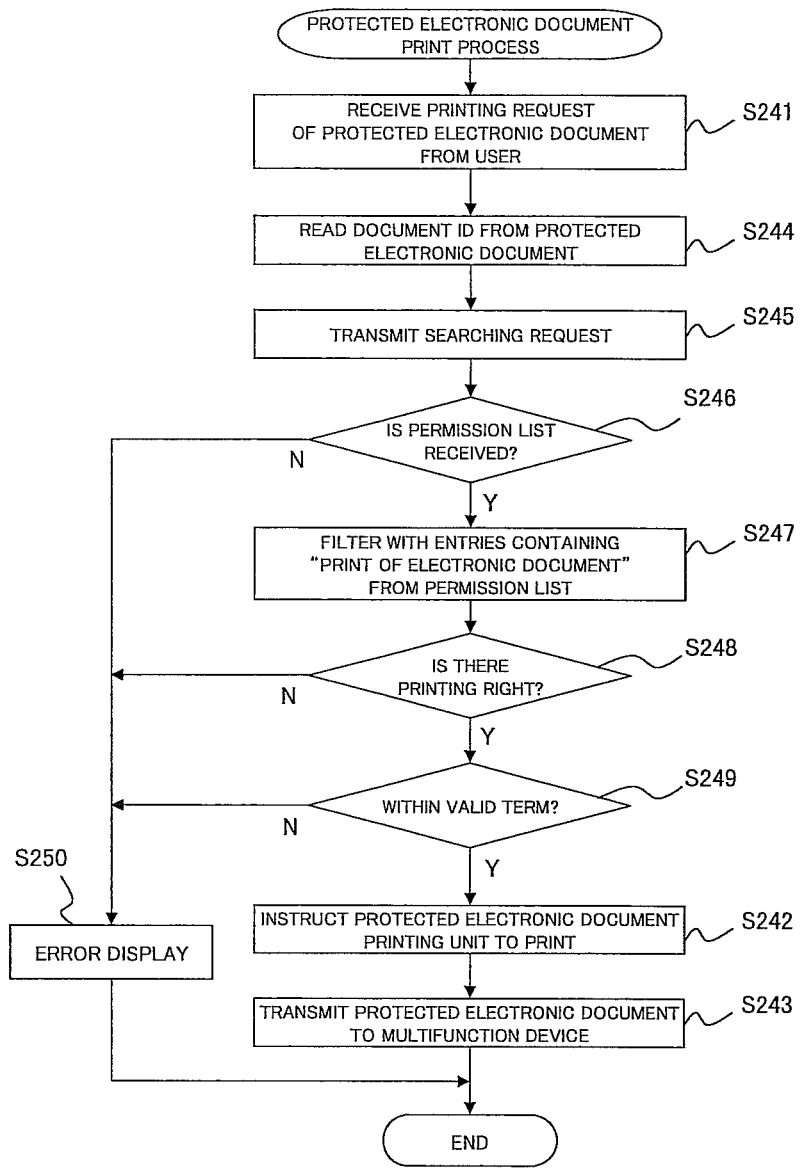
FIG. 22 is a flowchart showing a print process of a protected electronic document when a right is checked in a client PC in an exemplary embodiment according to the present invention.

In the present exemplary embodiment, because the checking of the right to allow or not allow execution of the printing process is executed on the side of the multifunction device 40, the document processing application side does not need to check the right. However, with such a configuration, the presence/absence of a printing right can be checked only after the document data is sent to the multifunction device 40, and, thus the data communication from the client PC 50 to the multifunction device 40 may sometimes be wasteful. In consideration of this, in the present exemplary embodiment, it is also possible to employ a configuration in which it is checked, before the document data is transmitted, as to whether or not the user has the printing right for the document to be transmitted. A right checking process executed on the side of the client PC 50 during the printing process will now be described with reference to a flowchart shown in FIG. 22. Processes identical to those in FIG. 21 are assigned the same step numbers.

When a user opening a protected electronic document in the client PC 50 requests printing of a protected electronic document, the controller 61 receives the printing request (step 241). The controller 61 reads the document ID from the protected electronic document to be printed (step 244), creates a searching request including various parameters including the document ID and the user ID which is used for the user authentication, and transmits the request to the security policy server 30 (step 245). The processes executed on the side of the security policy server 30 in response to the transmitted searching request are already described in "1.3 Security Policy Search".

Here, if error information such as information indicating that there is no search result is sent from the security policy server 30 in response to the searching request (N in step 246), an error message such as "you do not have printing right for designated document" is displayed on the display 8, and the process is completed (step 250). When, on the other hand, the permission list is sent from the security policy server 30 as a search result (Y in step 246), the controller 61 refers to the permission list, and filters the list with only the entries containing "printing of electronic document" (step 247). In the example configuration of FIG. 15, only the entries containing "Print" in the Operation tag are extracted. When the permission list is created by merging permitted function lists, the presence/absence of "Print" is checked. Here, if the "Print" is not contained (N in step 248), it is determined that a print right for the designated protected electronic document is not attached to the user, and an error stating that "you do not have printing right for designated document" is displayed on the display 8 (step 250).

When "Print" is contained (Y in step 248), the controller 61 then refers to the search result remaining after the filtering process, and checks whether or not there is a policy for which the valid term has not expired. Because the security policy server 30 is configured to not return a policy for which the valid term has expired, this process functions as a double-checking process. If there is no policy for which the valid term has not expired (N in step 249), an error message of "valid term of right for designated document has expired" is displayed and the process is completed (step 250).

If there is a policy for which the valid term has not expired (Y in step 249), the user is determined to have the printing right, and the controller 61 sends a printing instruction of the protected electronic document designated by the user to the protected document printing unit 60 (step 242). In response to the printing instruction, the protected document printing unit 60 reads the protected electronic document maintained in the document maintaining unit 57, converts the document into a print image, and instructs the multifunction device 40 designated by the user to print by transmitting the protected electronic document along with the document ID and the user ID (step 243).

2.5 Storage of Protected Electronic Document

Figure 23:
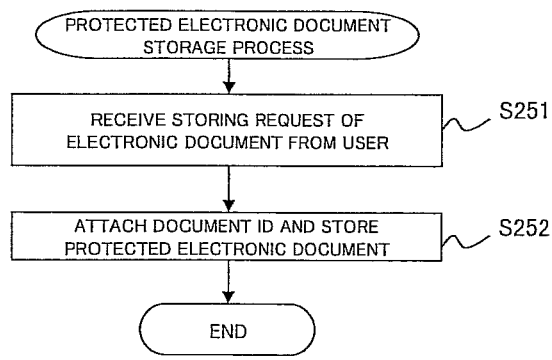
FIG. 23 is a flowchart showing a storage process of a protected electronic document in a client PC in an exemplary embodiment according to the present invention.

When a protected electronic document opened by a document processing application is to be stored (overwritten, renamed, etc.) in a file, the following process is executed. The storage process of the protected electronic document will now be described with reference to a flowchart shown in FIG. 23.

First, when a user selects storage through clicking or the like a predetermined storage button on the document processing application, the controller 61 receives the storing request corresponding to the user operation (step 251). The controller 61 determines that the electronic document is a protected electronic document if a document ID is assigned to the electronic document stored in the document maintaining unit 57, encrypts the body of the document with a predetermined encryption key, attaches a document ID, and stores the protected electronic document file in the protected electronic document storage 53 (step 252).

2.6 Switch of Protected Electronic Document

Figure 24:
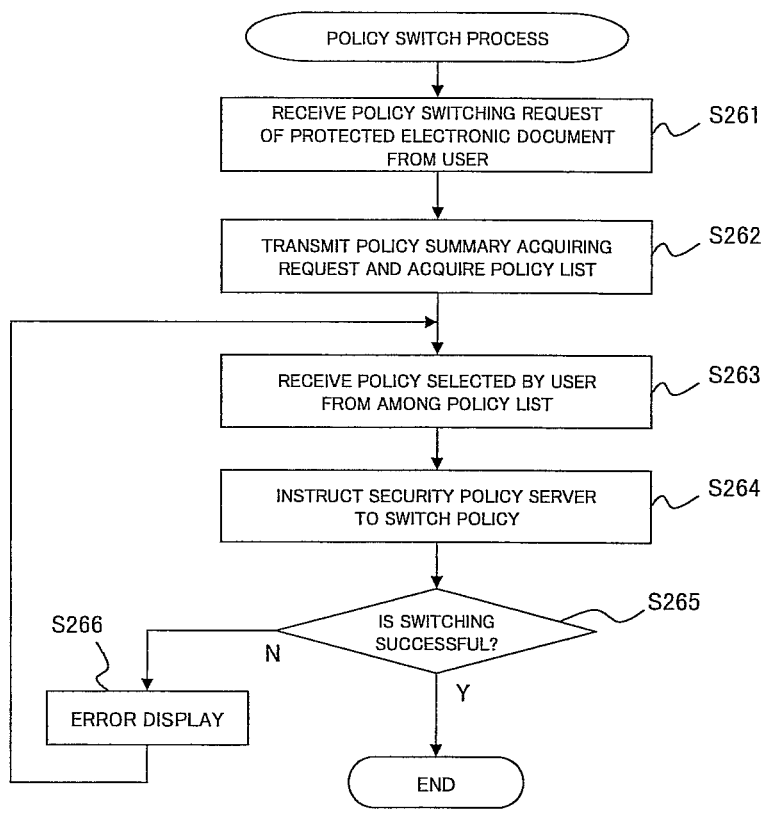
FIG. 24 is a flowchart showing a switch process of a protected electronic document in a client PC in an exemplary embodiment according to the present invention.

Switch of a policy of the protected electronic document is executed by selecting "policy switching of protected document" in the application while a protected electronic document file is opened by the document processing application. The policy switching process of the protected electronic document will now be described with reference to a flowchart shown in FIG. 24.

First, when a user selects by clicking or the like a predetermined switching button on the document processing application, the controller 61 receives a policy switching request corresponding to the user operation (step 261). The controller 61 acquires a list of security policies by transmitting a policy summary acquiring request to the security policy server 30 (step 262). The processes executed on the side of the security policy server 30 in response to the transmitted policy summary acquiring request are already described in "1.2 Security Policy Summary Response". When a summary list of policies is acquired, the controller 61 displays the acquired summary list of the policies in a format which can be understood by the user, and allows the user to select a policy to be applied. When a policy is selected, the controller 61 receives the selection (step 263), and then creates a switching request including various parameters such as the policy ID of the selected policy, document ID of the document for which policy is to be switched, and user ID, and instructs switching of the protected electronic document by transmitting the request to the security policy server 30 (step 264). The switching process executed by the security policy switching unit 34 which is called in response to the switching request is already described in "1.4 Security Policy Switching".

When information indicating success of the policy switching (TRUE) is sent from the security policy server 30 as a process result in response to the switching instruction (Y in step 265), the switching process in the client PC 50 is completed. When, on the other hand, information indicating failure of switching (FALSE) is sent (N in step 265), the information is displayed on the display 8 (step 266), and the process returns to step 263 for allowing selection of another policy.

3. Operation of Multifunction Device 40

The multifunction device 40 provides services such as printing of the protected electronic document and copying and scanning of a protected paper document. Here, with regard to copying and scanning of the normal paper document other than the protected paper document, the description is omitted because the process is similar to that in the related art.

3.1 Print of Protected Electronic Document

Figure 25:
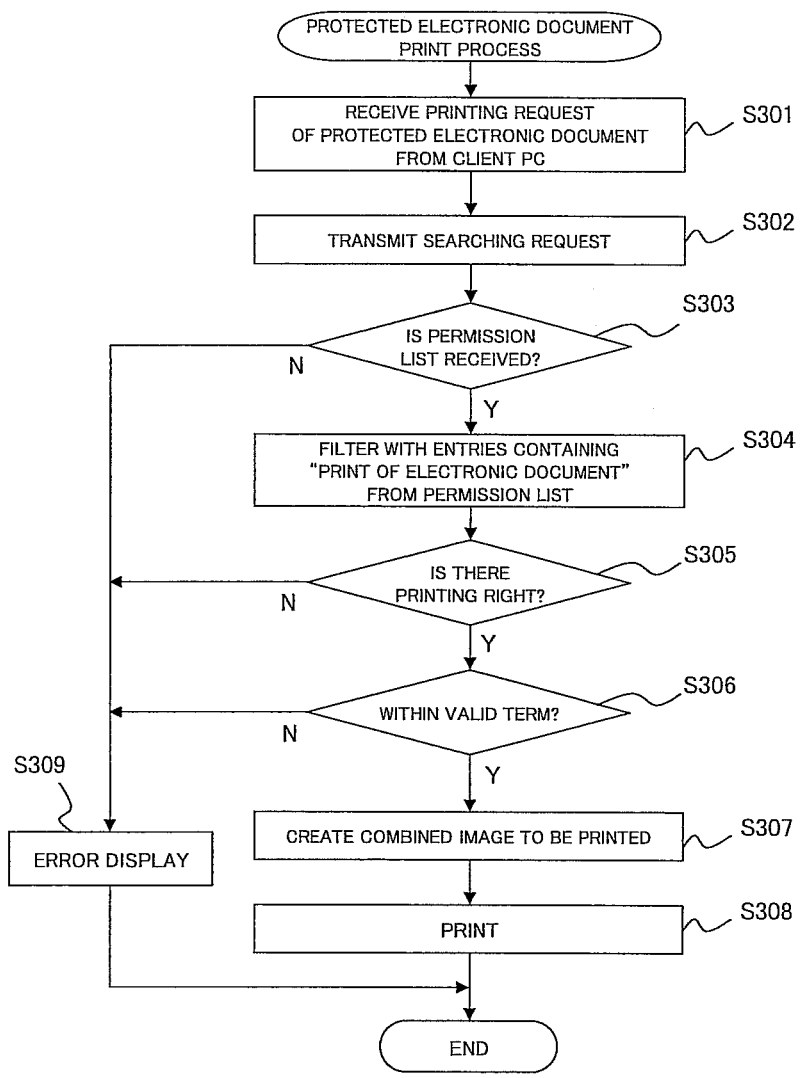
FIG. 25 is a flowchart showing a print process of a protected electronic document in a multifunction device in an exemplary embodiment according to the present invention.

A printing process of a protected electronic document will now be described with reference to a flowchart shown in FIG. 25.

As described above in "2.4 Print of Protected Electronic Document", when the user requests printing of a protected electronic document, the print image which can be printed in the multifunction device 40 is sent along with the document ID and user ID from the client PC 50 to the multifunction device 40. When the controller 48 receives the printing request (step 301), the controller 48 creates a searching request including various parameters including the document ID and the user ID included in the printing request, and transmits the request to the security policy server 30 (step 302). The processes executed on the side of the security policy server 30 in response to the transmitted searching request are already described in "1.3 Security Policy Search".

Here, when error information such as indication that there is no search result is sent from the security policy server 30 in response to the search request (N in step 303), the controller 48 displays an error message such as "you do not have printing right for designated document" on the operation panel 13 or records an error log in the HDD 15, and completes the process (step 309). When, on the other hand, a permission list is sent from the security policy server 30 as a search result (Y in step 303), the controller 48 refers to the permission list, and filters with only the entries containing "printing of electronic document" (step 304). In the example configuration of FIG. 15, only entries containing "Print" in the Operation tag are extracted. When the permission list is created by merging permitted function lists, the presence/absence of "Print" is checked. If "Print" is not contained (N in step 305), it is determined that the printing right for the designated protected electronic document is not attached to the user, and an error such as "you do not have printing right for designated document" is displayed on the operation panel 13 (step 309).

When "Print" is contained (Y in step 305), the controller 48 refers to the search result remaining after the filtering process, and checks whether or not there is a policy for which the valid term has not expired. Because the security policy server 30 is configured to not return policies for which the valid term has expired, this process functions as a double-checking process. When there is no policy for which the valid term has not expired (N in step 306), an error message such as "valid term of right for designated document has expired" is displayed and the process is completed (step 309).

On the other hand, if there is a policy for which the valid term has not expired (Y in step 306), the user is determined as having the printing right, and the controller 48 temporarily stores the print image, document ID, and user ID in the image maintaining unit 43, and calls the protected paper document creating unit 44. The protected paper document creating unit 44 instructs the document ID encoding unit 45 to convert the document ID received through the image maintaining unit 43 into a picture image of a code pattern such as a barcode. The protected paper document creating unit 44 combines the picture image of the document ID in the header and/or footer of the print image of the protected electronic document to be printed, to create a combined image to be printed (step 307). The printing unit 46 then prints the created combined image (step 308). FIG. 10 is a schematic diagram of paper when the protected electronic document is printed in this manner. Alternatively, it is possible to create a watermark of the document ID and print in a manner exemplified in FIG. 11.

3.2 Copy of Protected Paper Document

Figure 26:
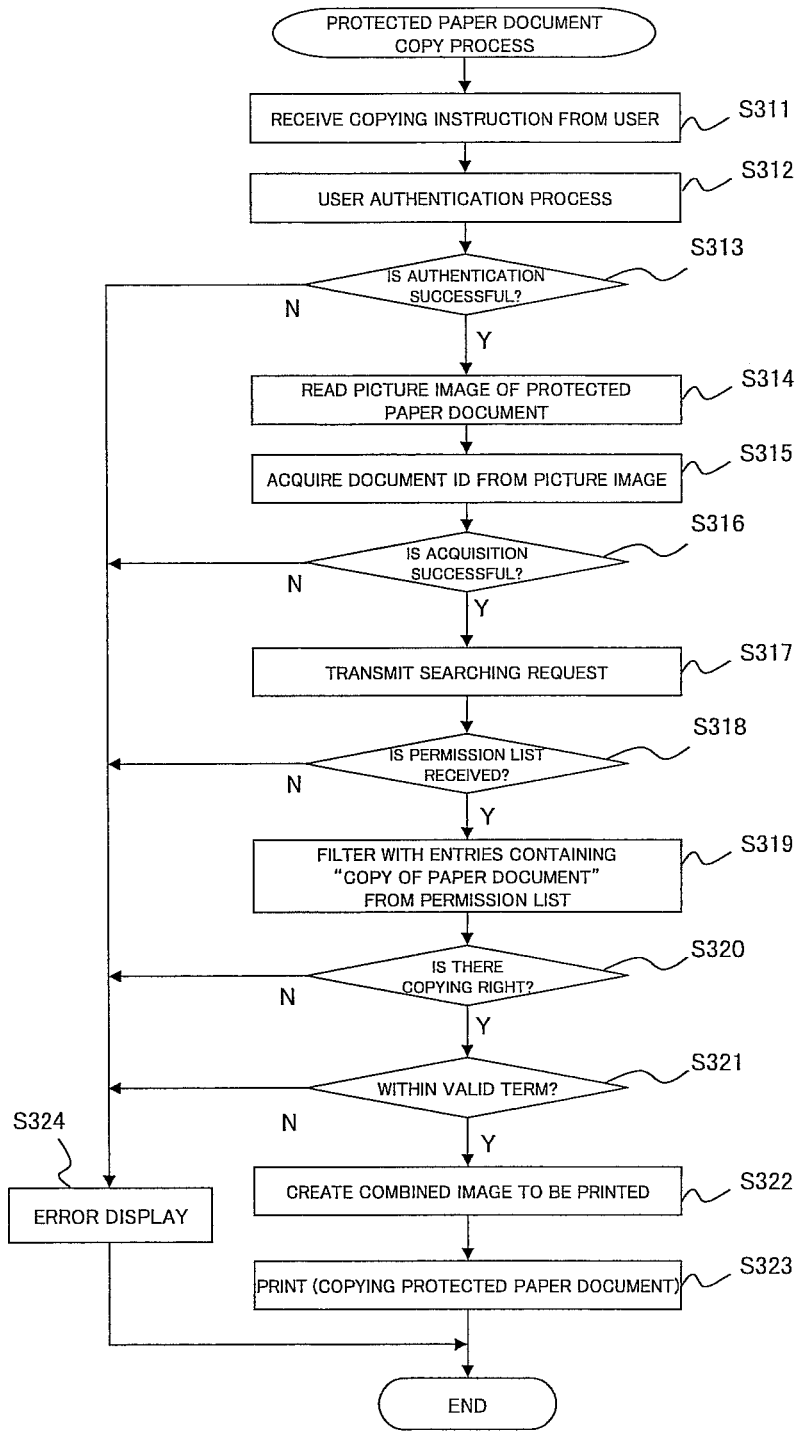
FIG. 26 is a flowchart showing a copy process of a protected paper document in a multifunction device in an exemplary embodiment according to the present invention.

A copying process of a protected paper document will now be described with reference to a flowchart shown in FIG. 26.

A user places the protected paper document on a platen of the multifunction device 40 or on an ADF (Auto Document Feeder), and presses a button of "copy protected document" displayed on the operation panel 13. When the controller 48 receives the copying instruction by the pressing operation of the user (step 311), the controller 48 displays a user authentication dialog on the operation panel 13, to ask the user for an input of the user ID and the password. When the user inputs the user ID and password, the input user ID and password are sent to the user authenticating unit 41. The user authenticating unit 41 checks whether or not the input information is correct by inquiring to the external user authentication server 23 (step 312). When the user authentication is successful (Y in step 313), the user ID is maintained. When the user authentication fails (N in step 313), the failure is displayed on the operation panel 13 (step 324), and the process is terminated.

After the user authentication is successful, the controller 48 scans the protected paper document and reads an image (step 314), and instructs the document ID decoding unit 47 to decode the picture image in the header and footer of the picture image, to acquire the document ID (step 315). When the document ID is incorporated in the protected paper document by watermarking, the watermark is decoded. When the decoding of the document ID fails and the document ID is not acquired (N in step 316), the failure is displayed on the operation panel 13 (step 324), and the process is terminated.

When decoding of the document ID is successful (Y in step 316), the controller 48 creates a searching request including various parameters including the decoded document ID and user ID which is used for the user authentication, and transmits the request to the security policy server 30 (step 317). The processes executed on the side of the security policy server 30 in response to the transmitted searching request are already described in "1.3 Security Policy Search".

Here, if error information such as information indicating that there is no search result is sent from the security policy server 30 in response to the searching request (N in step 318), the controller 48 displays an error message such as "you do not have copying right" on the operation panel 13 and the process is completed (step 324). When, on the other hand, the permission list is sent from the security policy server 30 as a search result (Y in step 318), the controller 48 refers to the permission list, and filters with only the entries containing "copying of paper document" (step 319). In the example configuration of FIG. 15, only the entries containing "Copy" in the Operation tag are extracted. When the permission list is created by merging permitted function lists, the presence/absence of "Copy" is checked. When "Copy" is not contained (N in step 320), it is determined that the copying right for the designated protected electronic document is not attached for the user, and an error such as "you do not have copying right" is displayed on the operation panel 13 and the process is completed (step 324).

When "Copy" is contained (Y in step 320), the controller 48 then refers to the search result remaining after the filtering process, and checks whether or not there is a policy for which the valid term has not expired. Because the security policy server 30 is configured to not return the policies for which the valid term is expired, this process functions as a double-checking process. When there is no policy for which the valid term has not expired (N in step 321), an error message of "valid term for right has expired" is displayed and the process is completed (step 324).

When there is a policy for which the valid term has not expired (Y in step 321), the user is determined as having the copying right, and the controller 48 temporarily stores the print image, document ID, and user ID in the image maintaining unit 43, and calls the protected paper document creating unit 44. The protected paper document creating unit 44 instructs the document ID encoding unit 45 to convert the document ID received through the image maintaining unit 43 into a picture image of a code pattern such as a barcode. The protected paper document creating unit 44 combines the image of the document ID into the header and/or footer of the print image of the protected electronic document to be printed, to create a combined image to be printed (step 322). Then, the printing unit 46 prints the created combined image (step 323). FIG. 10 is a schematic view showing the paper when the protected electronic document is printed in this manner. When the document ID is formed as a watermark in the protected paper document to be copied, the document ID is printed as a watermark 25, as shown in FIG. 11. The protected paper document is copied in this manner. In the present exemplary embodiment, in particular, the read image of the document ID is not simply copied and printed, but rather, is decoded once and then encoded again during printing of the copy, and thus the document ID data printed on the paper document is not degraded.

3.3 Scan of Protected Paper Document

Figure 27:
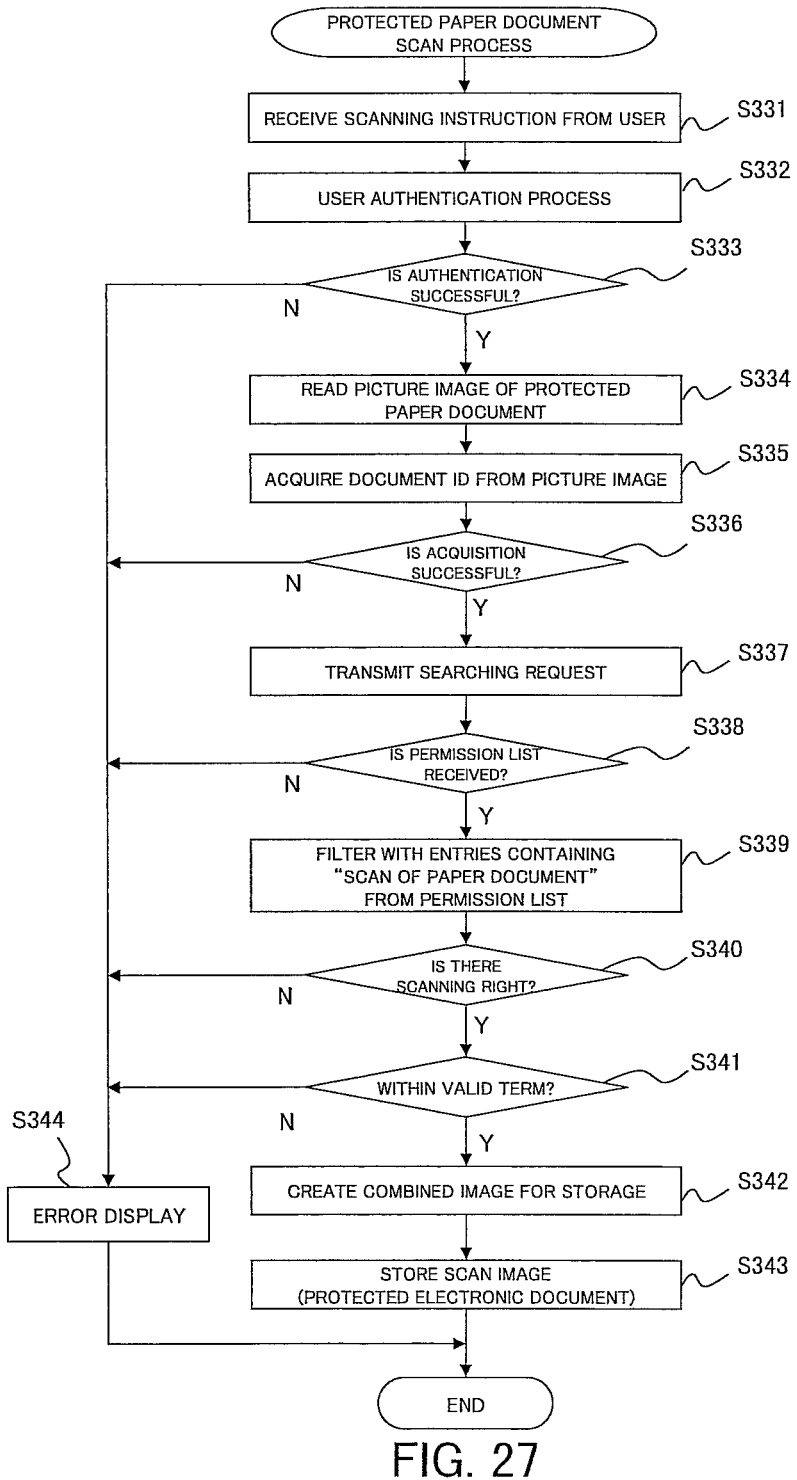
FIG. 27 is a flowchart showing a scan process of a protected paper document in a multifunction device in an exemplary embodiment according to the present invention.

When a protected paper document is scanned, the image of the paper document is converted to electronic data, but the image must be created as a protected electronic document. The basic processes for the scan of the protected paper document are similar to those in the copying process of the protected paper document in which the document is printed on a printing medium except that, in the scanning process of the protected electronic document, the electronic data is stored in a storage in place of printing on a printing medium. The scanning process of the protected paper document will now be described with reference to a flowchart shown in FIG. 27.

A user places a protected paper document on the platen of the multifunction device 40 or on the ADF and presses a button of "scan protected document" displayed on the operation panel 13. When the controller 48 receives the scanning instruction through the pressing operation by the user (step 331), the controller 48 displays a user authentication dialog on the operation panel 13, and asks the user for an input of a user ID and a password. When the user inputs the user ID and password, the controller 48 sends the input user ID and password to the user authenticating unit 41. The user authenticating unit 41 checks whether or not the input information is correct by inquiring the external user authentication server 23 (step 332). When the user authentication is successful (Y in step 333), the user ID is maintained. When, on the other hand, the user authentication fails (N in step 333), the failure is displayed on the operation panel 13 (step 344), and the process is terminated.

After the user authentication is successful, the controller 48 scans the protected paper document and reads the image (step 334), and instructs the document ID decoding unit 47 to decode the picture image of the header and footer of the picture image, to acquire the document ID (step 335). When the document ID is incorporated in the protected paper document by watermarking, the watermark is decoded. When the decoding of the document ID is unsuccessful and the document ID is not acquired (N in step 336), the failure is displayed on the operation panel 13 (step 344), and the process is terminated.

When the decoding of the document ID is successful (Y in step 336), the controller 48 creates a searching request including various parameters including the decoded document ID and the user ID which is used for user authentication, and transmits the request to the security policy server 30 (step 337). The processes executed on the side of the security policy server 30 in response to the transmitted searching request are already described in "1.3 Security Policy Search".

When error information such as information indicating that there is no search result is sent from the security policy server 30 in response to the searching request (N in step 338), the controller 48 displays an error message such as "you do not have scanning right" on the operation panel 13 and completes the process (step 344). When, on the other hand, a permission list is sent from the security policy server 30 as a search result (Y in step 338), the controller 48 refers to the permission list, and filters with only the entries containing "scan of paper document" (step 339). Although not included in the example configuration of FIG. 15, only the entries containing "Scan" in the Operation tag are extracted. When the permission list is created by merging permitted function lists, the presence/absence of "Scan" is checked. If "Scan" is not contained (N in step 340), it is determined that scanning right for the designated protected paper document is not attached for the user, and an error that "you do not have scanning right" is displayed on the operation panel 13 and the process is completed (step 344).

When, on the other hand, "Scan" is contained (Y in step 340), the controller 48 then refers to the search result remaining after the filtering process and checks whether or not there is a policy for which the valid term has not expired. Because the security policy server 30 is configured to not return the policies for which the valid term has expired, this process functions as a double-checking process. When there is no policy for which the valid term has not expired (N in step 341), an error message that "valid term of right has expired" is displayed and the process is completed (step 344).

When there is a policy for which the valid term has not expired (Y in step 341), the user is determined as having the scanning right, and the controller 48 temporarily stores the read image, document ID, and user ID in the image maintaining unit 43 and calls the protected electronic document creating unit 42. The protected electronic document creating unit 42 instructs the document ID encoding unit 45 to convert the document ID received through the image maintaining unit 43 into a picture image of a code pattern such as a barcode. In addition, after the protected electronic document creating unit 42 deletes the image of the document ID from the picture image of the protected paper document, the protected electronic document creating unit 42 encrypts the electronic document using a predetermined encryption key and combines the encoded document ID in the header and/or footer of the encrypted electronic document image, to create a protected electronic document to be stored (step 342). The protected electronic document is then stored in a location which can be accessed by a user of the multifunction device 40, for example, a private box of the user (step 343). In the scan process of the protected paper document also, similar to the copy process, the read image of the document ID is not simply stored, but rather decoded once and then encoded again, and thus the document ID data printed on the paper document is not degraded.

The details of the process in the protected electronic document creating unit 42 are basically similar to the processes of the protected electronic document creating unit 54 in the client PC 50. Because of this, in FIG. 8, constituent elements related to the protected electronic document creation process are omitted.

3.4 Policy Switch of Protected Paper Document

Figure 28:
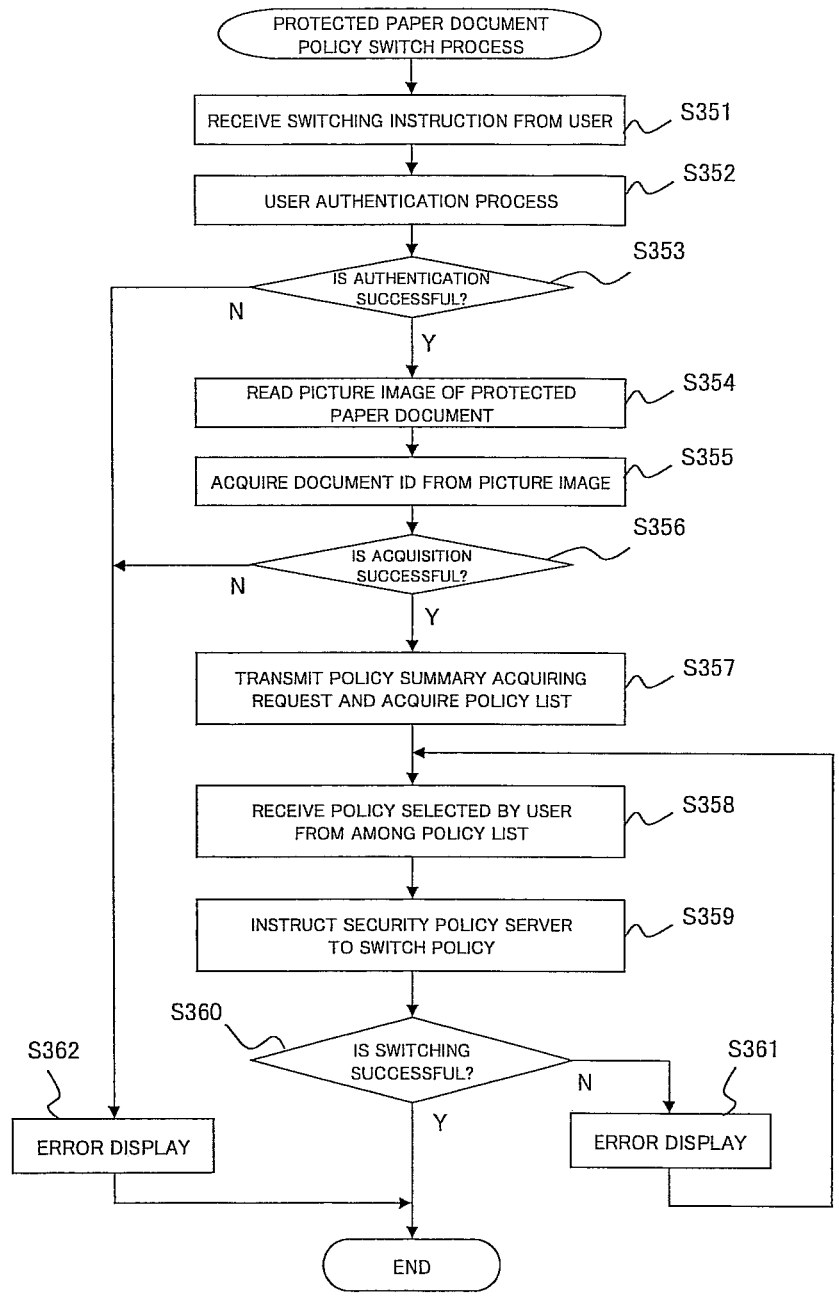
FIG. 28 is a flowchart showing a policy switch process of a protected paper document in a multifunction device in an exemplary embodiment according to the present invention.

A process for switching the policy using the multifunction device 40 will now be described with reference to a flowchart shown in FIG. 28.

A user places a protected paper document on the platen of the multifunction device 40 or on the ADF and presses a button of "policy switching of protected document" displayed on the operation panel 13. When the controller 48 receives the policy switching instruction through the pressing operation by the user (step 351), the controller 48 displays a user authentication dialog on the operation panel 13, and asks the user for an input of a user ID and a password. When the user inputs the user ID and the password, the input user ID and password are sent to the user authenticating unit 41. The user authenticating unit 41 checks as to whether or not the input information is correct by inquiring the external user authentication server 23 (step 352). If the user authentication is successful (Y in step 353), the user ID is maintained. When the user authentication fails (N in step 353), the failure is displayed on the operation panel 13 (step 362), and the process is terminated.

After the user authentication is successful, the controller 48 scans the protected paper document and reads an image (step 354), and instructs the document ID decoding unit 47 to decode a picture image of the header and footer of the picture image, to acquire the document ID (step 355). If the document ID is incorporated in the protected paper document by watermarking, the watermark is decoded. If the decoding of the document ID is unsuccessful and the document ID is not acquired (N in step 356), the failure is displayed on the operation panel 13 (step 362), and the process is terminated.

When decoding of the document ID is successful (Y in step 356), the controller 48 transmits a policy summary acquiring request to the security policy server 30, to acquire a list of security policies (step 357). The processes executed on the side of the security policy server 30 in response to the transmitted policy summary acquiring request are already described in "1.2 Security Policy Summary Response". When the summary list of policies is acquired, the controller 48 displays the acquired summary list of policies in a format which can be understood by the user, and allows the user to select a policy to be applied. When the policy is selected, the controller 48 receives the selection (step 358), and then creates a switching request including various parameters including the policy ID of the selected policy, document ID for which policy is to be switched, and the user ID, and transmits the request to the security policy server 30, to instruct switching of the protected electronic document (step 359). The switching process executed by the security policy switching unit 34 which is called in response to the switching request is already described in "1.4 Security Policy Switch".

When information indicating success of the policy switching (TRUE) is sent from the security policy server 30 in response to the switching instruction as a process result (Y in step 360), the switching process at the multifunction device 40 is completed. When, on the other hand, failure of switching (FALSE) is sent (N in step 360), the failure is displayed on the operation panel 13 (step 361), and the process returns to step 358 for allowing selection of another policy.

Figure 16:
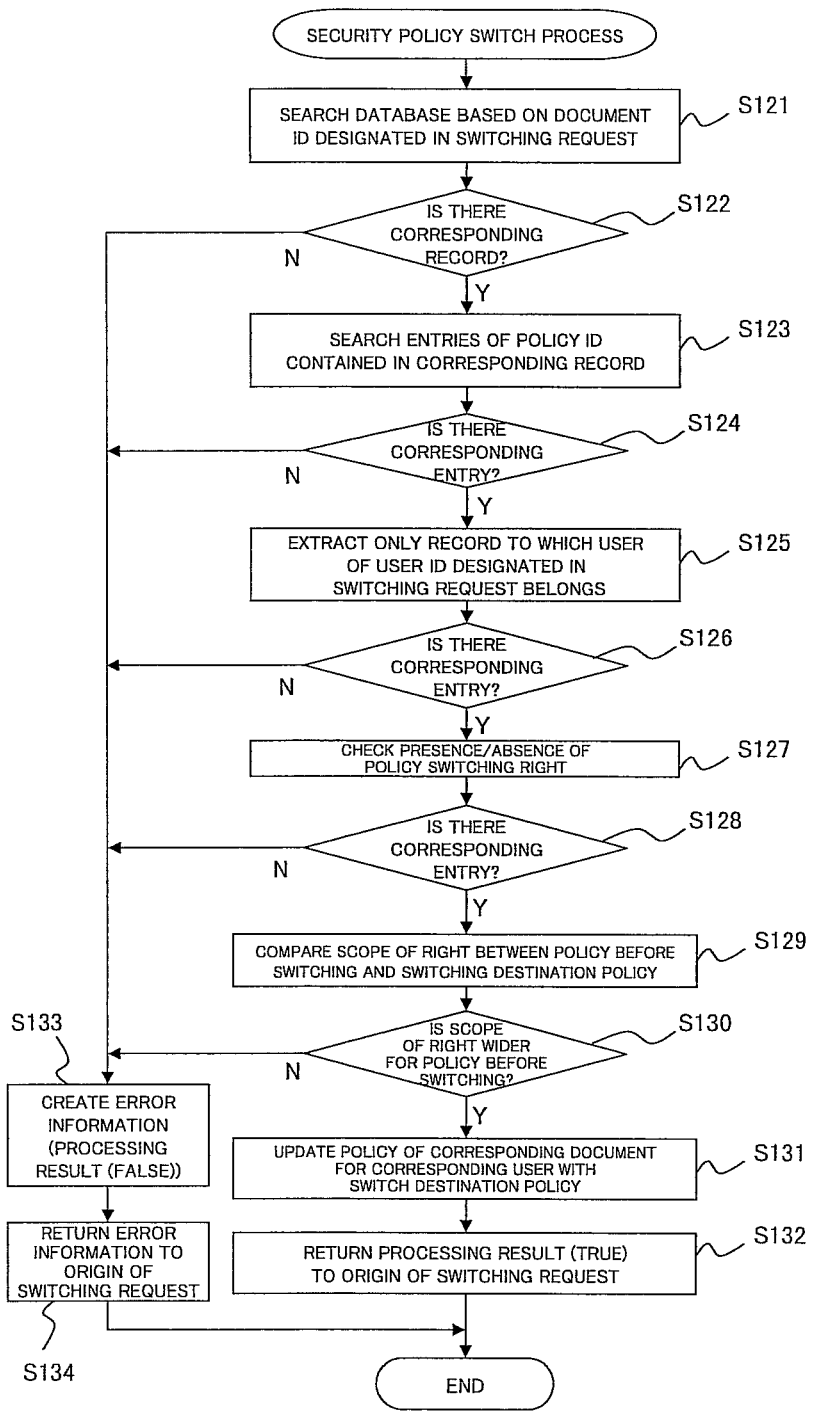
FIG. 16 is a flowchart showing a security policy switch process in an exemplary embodiment according to the present invention.

In the security policy switching process in the above-described exemplary embodiment, in order to restrict the switching destination policy, the scope of right of the switching destination policy and the scope of right of the policy before switching, that is, the current policy are compared (step 129 in FIG. 16). This process may be realized in the following manner.

The restriction on the policy to which the policy can be switched may be separately described. In other words, conditions to be satisfied by a switching destination policy are described. The conditions may be, for example, that there is no printing right of electronic documents, that there is no copying right of paper document, and that there is no policy switching right. Alternatively, the conditions may be described along with the usage range (group, user).

Alternatively, the policy to which the policy can be switched may be directly designated. FIG. 29 shows an example data structure of the security policy database 35 in this alternative exemplary embodiment. In this case, if there is a policy switching right, designation of the ID of the policy to which the policy can be switched is provided along with the designation that there is a switching right. In this manner, when the user requests switching of the policy, the user can switch the policy by merely instructing the switch, without inputting and designating the ID of the switching destination policy. FIG. 29 shows an example configuration in which a "creator" of the "in-section reference for software development section" can switch to the policy of the policy ID of "0003". In addition, the policy switching is never determined as impossible due to the restriction for the policy. Alternatively, rather than limiting the designation of the ID of the policy to which the policy can be switched to one ID, multiple IDs may be designated. In this case, by allowing the user to select from among the multiple designated policies, it is possible for the user to not input and designate the ID of the switching destination policy when the user requests switching of the policy, and the switching is not determined as impossible due to the restriction on the policy. According to this exemplary embodiment, because the content of the switching destination policy is determined in advance and the switching is permitted only to that policy, it is not necessary to place a restriction based on the contents of the policy before switching and the switching destination policy and it is possible to switch to a policy having a completely independent content. Alternatively, it is also possible to employ a configuration in which multiple policy IDs to which the policy can be switched are listed and the switching destination is set to be selectable when the user switches the policy.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with various modifications as are suited to the particular use contemplated. It is intended that the scope of the invention be defined by the following claims and their equivalents.

What is claimed is:

1. A security policy server comprising:
   a policy information memory device that stores policy setting information and identification information of a policy in correspondence to each other, the policy setting information including a setting content of the policy and identification information of a user to whom the policy is attached;
   a data information memory device that stores identification information of data for which a policy is set and identification information of the policy attached to the data in correspondence to each other;

a security policy responding device that searches security policy data registered in a security policy database in response to an inquiry, the inquiry having document identification information and user identification information as search conditions, and creates a summary list of security policies that match the search conditions in the inquiry, the summary list of security policies being used to designate the identification information of the policy which is to be switched; and a policy switching processing device that switches, in response to a switching request designating identification information of data, for which the policy is to be switched, and identification information of a user instructing the switch, the policy attached to the data by updating only the identification information of the policy attached to the data stored in the data information memory device with identification information of a policy to be switched to;

said policy switching processing device permitting switching of the policy attached to the data only when operations permitted based on the policy attached to the data include policy switching.

2. The security policy server according to claim 1, wherein the policy switching processing device updates, when the switching request further designates identification information of the policy to be switched to by switching, the identification information of the policy attached to the data stored in the data information memory device with the designated identification information of the policy to be switched to.

3. The security policy server according to claim 2, wherein the policy switching processing device permits switching of the policy attached to the data only when operations permitted based on the policy to be switched to corresponding to the identification information of the policy to be switched to designated as a switching target are more restricted than operations permitted based on the policy attached to the data.

4. The security policy server according to claim 1, wherein the policy setting information further including identification information of policies to which a policy attached to the data can be switched in response to a switching request.

5. A security policy server comprising:

a policy information memory device that stores policy setting information and identification information of a policy in correspondence to each other, the policy setting information including a setting content of the policy and identification information of a user to whom the policy is attached;

a data information memory device that stores identification information of data for which a policy is set and identification information of the policy attached to the data in correspondence to each other;

a security policy responding device that searches security policy data registered in a security policy database in response to an inquiry, the inquiry having document identification information and user identification information as search conditions, and creates a summary list of security policies that match the search conditions in the inquiry, the summary list of security policies being used to designate the identification information of the policy which is to be switched; and a policy switching processing device that switches, in response to a switching request designating identification information of data for which the policy is to be switched, and identification information of a user instructing the switch, the policy attached to the data by updating only the identification information of the policy attached to the data stored in the data information memory device with identification information of a policy to be switched to;

said policy setting information including identification information of a policy to which the policy can be switched in response to a switching request;

said policy switching processing device updating, when the switching request does not designate identification information of the policy to be switched to through the switching, the identification information of the policy attached to the data stored in the data information memory device with the identification information of the policy to which the policy can be switched, included in the policy setting information;

said policy switching processing device permitting switching of the policy attached to the data only when operations permitted based on the policy attached to the data include policy switching.

6. A security policy server comprising:

a policy information memory device that stores policy setting information and identification information of a policy in correspondence to each other, the policy setting information including a setting content of the policy and identification information of a user to whom the policy is attached;

a data information memory device that stores identification information of data for which a policy is set and identification information of the policy attached to the data in correspondence to each other;

a security policy responding device that searches security policy data registered in a security policy database in response to an inquiry, the inquiry having document identification information and user identification information as search conditions, and creates a summary list of security policies that match the search conditions in the inquiry, the summary list of security policies being used to designate the identification information of the policy which is to be switched; and a policy switching processing device that switches, in response to a switching request designating identification information of data for which the policy is to be switched, and identification information of a user instructing the switch, the policy attached to the data by updating only the identification information of the policy attached to the data stored in the data information memory device with identification information of a policy to be switched to;

said policy setting information including identification information of a policy to which the policy can be switched in response to a switching request;

said policy switching processing device updating, when the switching request designates identification information of the policy to be switched to through the switching and the designated identification information of the policy to be switched to is included in the identification information of the policies to which the policy attached to the data can be switched, the identification information of the policy attached to the data stored in the data information memory device with the designated identification information of the policy to be switched to;

said policy switching processing device permitting switching of the policy attached to the data only when operations permitted based on the policy attached to the data include policy switching.

7. A non-transitory computer-readable storage medium storing a security policy switching program which, when executed, causes a security policy server computer to function as:
  storing policy setting information and identification information of a policy in
  correspondence to each other, the policy setting information including a setting content of the policy and identification information of a user to whom the policy is attached;
  storing identification information of data for which a policy is set and identification information of the policy attached to the data in correspondence to each other;
  searching security policy data registered in a security policy database in response to an inquiry, the inquiry having document identification information and user identification information as search conditions;
  creating a summary list of security policies that match the search conditions in the inquiry, the summary list of security policies being used to designate the identification information of the policy which is to be switched;
  switching, in response to a switching request designating identification information of data for which the policy is to be switched and identification information of a user instructing the switch, the policy attached to the data by updating only the identification information of the policy attached to the data stored in the data information storage with identification information of a policy to be switched to; and
  permitting switching of the policy attached to the data only when operations permitted based on the policy attached to the data include policy switching.

8. The non-transitory computer-readable storage medium according to claim 7, wherein the policy setting information further including identification information of policies to which a policy attached to the data can be switched in response to a switching request.

9. A security policy management system comprising:
  a security policy server computer; and a client computer that is used for setting of a security policy;
  said security policy server computer including,
    a policy information memory that stores policy setting information and identification information of a policy in correspondence to each other, the policy setting information including a setting content of the policy and identification information of a user to whom the policy is attached,
    a data information storage that stores identification information of data for which a policy is set and identification information of the policy attached to the data in correspondence to each other, a security policy responding device that searches security policy data registered in a security policy database in response to an inquiry, the inquiry having document identification information and user identification information as search conditions, and creates a summary list of security policies that match the search conditions in the inquiry, the summary list of security policies being used to designate the identification information of the policy which is to be switched, and
    policy switching unit that switches, in response to a switching request designating identification information of data for which the policy is to be switched and identification information of a user instructing the switch, the policy attached to the data by updating only the identification information of the policy attached to the data stored in the data information storage with identification information of a policy to be switched to, and the client computer comprises a unit that transmits, to the security policy server computer, a switching request designating identification information of data for which the policy is to be switched and identification information of a user instructing the switch;
  said policy switching unit permitting switching of the policy attached to the data only when operations permitted based on the policy attached to the data include policy switching.

10. The security policy management system according to claim 9, wherein the policy setting information further including identification information of policies to which a policy attached to the data can be switched in response to a switching request.

11. A security policy switching method comprising:
  storing policy setting information and identification information of a policy in
  correspondence to each other, the policy setting information including a setting content of the policy and identification information of a user to whom the policy is attached;
  storing identification information of data for which a policy is set and identification information of the policy attached to the data in correspondence to each other;
  searching security policy data registered in a security policy database in response to an inquiry, the inquiry having document identification information and user identification information as search conditions;
  creating a summary list of security policies that match the search conditions in the inquiry, the summary list of security policies being used to designate the identification information of the policy which is to be switched;
  switching, using a processor, in response to a switching request designating identification information of data for which the policy is to be switched and identification information of a user instructing the switch, the policy attached to the data by updating only the identification information of the policy attached to the data stored in the data information storage with
  identification information of a policy to be switched to; and
  permitting switching of the policy attached to the data only when operations permitted based on the policy attached to the data include policy switching.

12. The security policy switching method according to claim 11, wherein the policy setting information further including identification information of policies to which a policy attached to the data can be switched in response to a switching request.

* * * * *